United States Patent
Van de Velde et al.

(10) Patent No.: US 12,552,602 B1
(45) Date of Patent: Feb. 17, 2026

(54) INVENTORY SYSTEM WITH ITEM RETRIEVAL

(71) Applicant: Amazon Technologies, Inc., Seattle, WA (US)

(72) Inventors: Thomas Van de Velde, Redmond, WA (US); Praveen Kumar Peddi, Westford, MA (US); Nicholas Mark Johnson, Westford, MA (US); Yashoda Dadkar, Andover, MA (US); Wendy Palto, Medford, MA (US); Lisa Anne Swanson, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 865 days.

(21) Appl. No.: 17/840,316

(22) Filed: Jun. 14, 2022

(51) Int. Cl.
*B65G 1/06* (2006.01)
*B65G 1/04* (2006.01)

(52) U.S. Cl.
CPC ............. *B65G 1/0435* (2013.01); *B65G 1/06* (2013.01)

(58) Field of Classification Search
CPC ................................ B65G 1/0435; B65G 1/06
See application file for complete search history.

(56) References Cited

U.S. PATENT DOCUMENTS

| | | | |
|---|---|---|---|
| 11,104,514 B2* | 8/2021 | Cheng | B66F 9/063 |
| 11,365,050 B2* | 6/2022 | Liu | B66F 9/063 |
| 11,548,770 B2* | 1/2023 | Zhan | B65G 1/04 |
| 11,655,099 B2* | 5/2023 | Cheng | B25J 15/0014 |
| | | | 414/273 |
| 11,858,736 B2* | 1/2024 | Zhan | B65G 1/0435 |
| 11,945,706 B2* | 4/2024 | Kong | B65G 1/0492 |
| 12,017,854 B2* | 6/2024 | Chen | B65G 1/0435 |
| 12,103,771 B2* | 10/2024 | Cheng | B25J 13/08 |
| 2023/0211949 A1* | 7/2023 | Xiao | B65G 1/0492 |
| | | | 414/279 |
| 2024/0017395 A1* | 1/2024 | Wu | B25J 9/162 |
| 2024/0092579 A1* | 3/2024 | Liu | B65G 1/1375 |
| 2024/0367900 A1* | 11/2024 | Li | B65G 1/0407 |

FOREIGN PATENT DOCUMENTS

WO 2018129362 A1 7/2018

OTHER PUBLICATIONS

"Geek+ Double Deep Tote-to-Person RS5-D Roboshuttle System", https://www.youtube.com/watch?v=AnjaA6318-U , retrieved from Internet on Mar. 26, 2022, 9 pages.
"Tote-to-Person Roboshuttle Picking", http://www.geekplus.com/product/roboshuttle, retrieved from Internet on Mar. 26, 2022, 8 pages.

* cited by examiner

*Primary Examiner* — Patrick H Mackey
(74) *Attorney, Agent, or Firm* — Kilpatrick Townsend & Stockton LLP

(57) ABSTRACT

A handler for use in an inventory handling system can include a frame with at least one upright defining a first lateral side opposite a second lateral side. A plurality of staging shelves can be arranged above one another and supported along the first lateral side. A platform can be raisable and lowerable along the second lateral side of the frame. A telescoping arm can be extendable away from the platform for engaging a container and retractable toward the platform for moving the container onto the platform. The telescoping arm can be further retractable for movement of the container from the platform to one of the plurality of staging shelves.

16 Claims, 16 Drawing Sheets

INVENTORY SYSTEM WITH ITEM RETRIEVAL

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space, equipment, and manpower, can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which.

DETAILED DESCRIPTION

Figure 1:
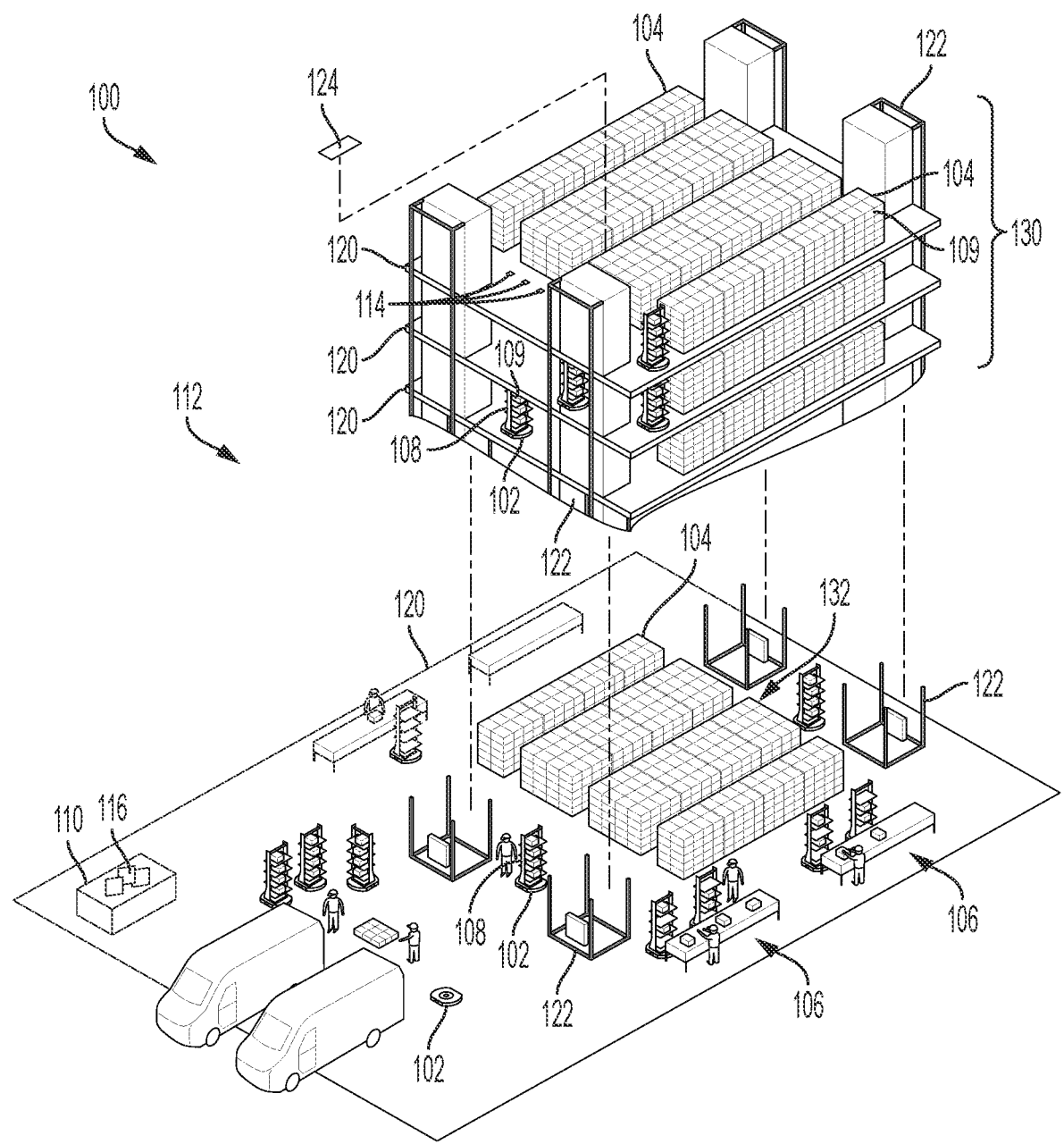
FIG. 1 is a perspective view of components that may be included in an inventory system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein are directed to inventory systems, for example, inventory systems for transporting and sorting items. Items may be stored in inventory holders. The inventory holders can include shelves and/or compartments for receiving items or containers with items therein. The inventory system can also include handlers that may move among the inventory holders to remove and/or insert items and/or containers relative to the inventory holders. The inventory handlers may include components of or otherwise be moved by mobile drive units (e.g., a fleet of mobile drive units) that can move around a warehouse environment, for example. The inventory handlers can move and/or be moved to carry items and/or containers from inventory holders to stations. For example, at stations, the items may be consolidated into groups to fulfill customer orders and/or otherwise be processed for subsequent operations.

As an illustrative example, an inventory handler may include a frame formed by at least one upright. The upright may define a first lateral side opposite a second lateral side of the handler. Multiple staging shelves may be arranged above one another and supported along the first lateral side. A platform may be raisable and lowerable along the second lateral side of the frame. A telescoping arm may be extendable from the platform for engaging a container on a storage shelf of a rack or other inventory holder. The telescoping arm may also be retractable toward the platform for moving the container onto the platform. For example, the telescoping arm may include a hook (e.g., which may be collapsible to fold and fit under, over, or alongside the container during extension of the telescoping arm, and deployable to a position suitable for pulling the container during retraction of the telescoping arm). When the platform is vertically aligned at a suitable height, the arm may further retract to a position alongside a given staging shelf to impart movement so that the container is moved from the platform and onto that staging shelf.

Continuing this illustrative example, the inventory handler may repeat the process of raising or lowering to a height of a subsequent container on the same or a different storage shelf, operating the telescoping arm to load the subsequent container onto the platform, and operating the telescoping arm to further retract to move the container onto a different staging shelf of the handler. In this way, the handler may load a suitable number of containers onto staging shelves for transport to a station or other processing location.

The inventory handler may also include suitable components for relocating a container from the handler to a storage shelf. For example, the staging shelf may include rollers or other form of offloader capable of moving the container from the staging shelf back to the platform. In some embodiments, the telescoping arm may include a projection capable of pushing the container from behind to move the container back onto a storage shelf of an inventory holder, for example.

In some embodiments, the handler may be capable of working with containers that are arranged at least two deep on a storage shelf. For example, the handler may grab a near container from a storage shelf and temporarily stow on a first staging shelf. The handler may then proceed to grab a far container from the storage shelf and stow on a second staging shelf. The handler may then move the original near container from the first staging shelf back to the platform and back from the platform to a suitable location on the same or a different storage shelf.

Referring now to the drawings, in which similar identifiers refer to similar elements, FIG. 1 illustrates a perspective view of an example of an inventory system 100, according to embodiments. The inventory system 100 can move inventory items between locations within a warehouse (e.g., workspace 112). For example, the inventory system 100 can facilitate the entry, processing, and/or removal of inventory items from the inventory system 100 and the completion of other tasks involving the inventory items. The inventory system 100 can include one or more mobile drive units 102 (e.g., a fleet of mobile drive units 102) (also referred to as autonomous vehicles, autonomous surface vehicles, autonomous robotic vehicles, mobile drive units, unmanned aerial vehicles, etc.), one or more inventory holders 104, one or more inventory stations 106, one or more inventory handlers 108, and/or a management module 110. The components of the inventory system 100 may operate within a workspace 112.

In some embodiments, the inventory holders 104 may be stationary or fixed in position within the workspace 112. The inventory handlers 108 may be moved among the inventory holders 104 to handle items and/or containers 109 relative to the inventory holders 104. For example, the inventory handlers 108 may be operated for removing items and/or containers 109 from the inventory holders 104 and/or depositing items and/or containers on the inventory holders 104. The inventory handlers 108 may be moved among the inventory holders 104 and/or other locations within the workspace 112 by mobile drive units 102 or may include other forms of suitable propulsion systems. For simplicity, description herein will primarily discuss mobile drive units 102 being used for transporting inventory handlers 108, although similar functionality may be utilized for transporting inventory holders 104 additionally or alternatively (e.g., in embodiments in which at least some inventory holders 104 are mobile and suitable for transport by mobile drive units 102). More broadly, any function described herein relative to an inventory handler 108 may additionally or alternatively be applicable relevant to an inventory holder 104 in various embodiments.

The mobile drive units 102 (e.g., each drive unit) can transport the inventory handlers 108 between locations within a workspace 112. For example, each mobile drive unit 102 can transport one or more inventory handlers 108. The mobile drive units 102 can transport the inventory handlers 108 in response to commands communicated by the management module 110. The inventory handlers 108 can be carried, rolled, and/or otherwise moved by the mobile drive units 102.

In various embodiments, the inventory holders 104 can store inventory items of the inventory system 100. For example, the inventory holders 104 can include multiple storage bins with each storage bin capable of holding one or more types of inventory items. The inventory holders 104 can include one or more spaces (e.g., cubbies, shelves, slots, etc.) that can receive one or more types of inventory items. The inventory holders 104 may include items within totes, boxes, bags, or other forms of containers 109. In some embodiments, the inventory holders 104 may correspond to commodity shelving, e.g., which may include shelves supported by pillars that are permanently installed to define a series of aisles between the shelves.

The inventory items represent any objects suitable for storage, retrieval, and/or processing in the inventory system 100. For example, inventory items can be or include one or more objects of a particular type that are stored in the inventory system 100. In further embodiments, a particular inventory holder 104 and/or inventory handler 108 can store a particular inventory item if the inventory holder 104 and/or inventory handler 108 currently holds one or more of the same item type.

Turning to a particular example, the inventory system 100 can represent a mail-order or other order-fulfillment warehouse facility, and inventory items can represent merchandise stored in the warehouse facility. During operation, the mobile drive units 102 can carry an inventory handler 108 containing one or more inventory items that are requested in an order to be packed for delivery to a customer. Alternatively or additionally, the inventory handler 108 may contain aggregated collections of inventory items for shipment. Moreover, in particular embodiments of the inventory system 100, boxes containing completed orders may themselves represent inventory items.

The mobile drive units 102 can be or include any suitable devices and/or components appropriate for use in the inventory system 100. For example, the mobile drive units 102 can include components based on the characteristics and configuration of the inventory holders 104, inventory handlers 108, and/or other elements of the inventory system 100. In some embodiments of the inventory system 100, the mobile drive units 102 can be or include autonomous robotic vehicles that can move about the workspace 112. One or more of the mobile drive units 102 can be equipped with sensors (e.g., a stereo camera), which may enable the drive unit(s) to detect obstacles (e.g., items or objects) and alert human operators to the location of the obstacles, so that the obstacles can be removed.

Figure 2:
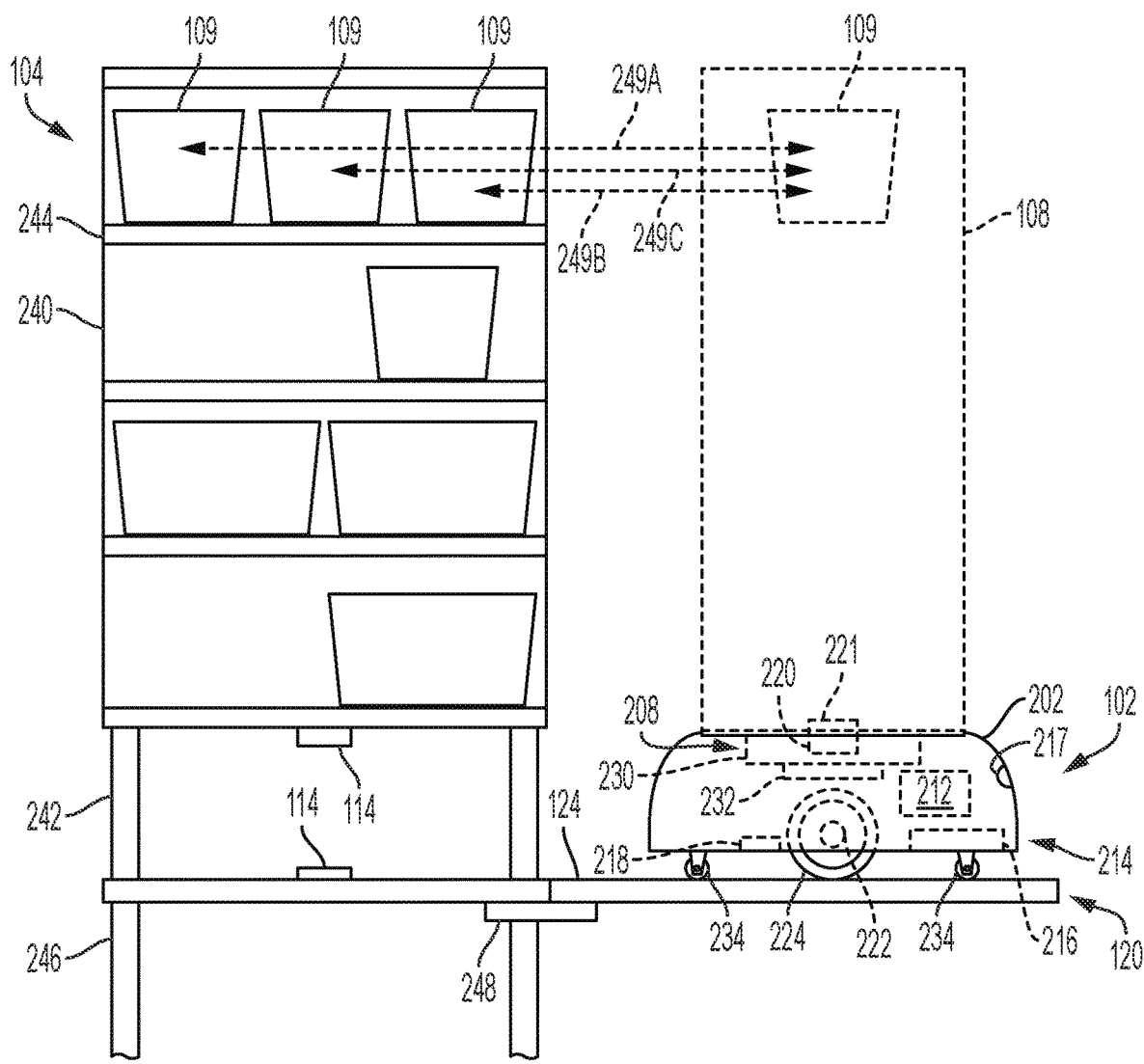
FIG. 2 is a side view of an inventory holder, an inventory handler, and a mobile drive unit as examples of components that may be utilized in the inventory system shown in FIG. 1 in accordance with various embodiments.

In various embodiments, (e.g., as shown in FIG. 2) the mobile drive units 102 can include one or more sensors 218. The sensors 218 can detect various objects in the workspace 112. For example, the sensors 218 can detect inventory items, inventory holders 104, inventory handlers 108, other mobile drive units 102, inventory stations 106, and/or individuals in the workspace 112. The sensors 218 can be or include a camera, Lidar, a color sensor, a cliff sensor radar, a proximity sensor, an impact sensor, a magnetic sensor, an electrical sensor, a color sensor, a cliff sensor, an electromagnetic sensor (e.g., to detect electromagnetic field intensity and/or orientation), a brightness sensor, a spectrometer, a photometer, and/or any suitable sensors for detecting objects in the workspace 112.

In various embodiments, one or more fiducials 114 (e.g., fixed navigation anchors) can be positioned in the workspace 112 (e.g., on the floor, ceiling, and/or wall of the workspace 112). The fiducials 114 can be used for navigation (e.g., provide navigational references and/or directions to the mobile drive units 102). The fiducials 114 can additionally or alternatively be used to demarcate different regions (e.g., different functional regions within the workspace 112). In further embodiments, the fiducials 114 can include a calibration fiducial positioned in a calibration region and used to identify a calibration position (e.g., a position that is a known distance and/or angular position relative to a calibration fixture to provide readings that can facilitate calibration of the mobile drive units 102). The fiducials 114 can be or include stickers, markers, markings, and/or physical objects (e.g., an alignment pin).

In various embodiments, the mobile drive units 102 can operate without human intervention in a structured area (e.g., using the fiducials 114). For examples, the fiducials 114 can be detected by sensors on the mobile drive units 102 to aid in the navigation of the mobile drive units 102 around the workspace 112.

In further embodiments, the mobile drive units 102 can additionally or alternatively operate without human intervention in an unstructured area (or field) that does not contain fiducials. For example, the mobile drive units 102 can be equipped with autonomous navigation functions and/or sensors 218 that enable the mobile drive unit 102 to maneuver within the workspace 112 without the use of fiducials.

The workspace 112 can represent an area associated with the inventory system 100. For example, the workspace 112 can be a place in which the mobile drive units 102 can move and/or in which the inventory holders 104 and/or inventory handlers 108 can be stored. In various embodiments, the workspace 112 can represent some or all of the floor of a warehouse environment in which the inventory system 100 operates. Although FIG. 1 shows, for the purposes of illustration, an embodiment of the inventory system 100 in which the workspace 112 includes a fixed, predetermined, and finite physical space, particular embodiments of the inventory system 100 may include mobile drive units 102 and/or inventory handlers 108 that are configured to operate within a workspace 112 that is of variable dimensions and/or of an arbitrary geometry. Similarly, while FIG. 1 illustrates a particular embodiment of the inventory system 100 in which the workspace 112 is entirely enclosed in a warehouse environment, alternative embodiments can utilize the workspace 112 in which some or all of the workspace 112 is located, for example, outdoors, within a vehicle (such as a cargo ship), and/or otherwise unconstrained by any fixed structure. In addition, although FIG. 1 shows the workspace 112 as arranged in a rectangular shape, the workspace 112 may include any suitable form factor, including L-shaped, clusters, etc. In some embodiments, the workspace 112 may include an area of a retail store or other setting in which the inventory system 100 has been deployed.

The management module 110 can assign tasks to appropriate components of the inventory system 100 and/or can coordinate operation of the various components of the inventory system 100 in completing the tasks. These tasks can relate to the movement and processing of inventory items and/or to the management and maintenance of the components of the inventory system 100. For example, the management module 110 can assign portions of the workspace 112 for "parking" the mobile drive units 102, for example, for recharging and/or replacing batteries of the mobile drive units 102. The management module 110 can additionally or alternatively assign a portion of the workspace 112 for the storage of empty inventory handlers 108 and/or any other operations associated with the functionality supported by the inventory system 100 and its various components.

In various embodiments described herein, the management module 110 can instruct movement and/or operation of inventory handlers 108. For example, the management module 110 can instruct the mobile drive units 102 to move inventory handlers 108 to suitable locations for interacting with inventory holders 104. The management module 110 may provide instructions for causing actuation of components of the inventory handlers 108 suitable for manipulating containers 109 and/or items relative to inventory holders 104. The management module 110 may provide instructions to the inventory handlers 108 directly or via the mobile drive units 102, for example.

The management module 110 may select components of the inventory system 100 to perform the tasks and communicate appropriate commands and/or data to the selected components to facilitate completion of the various operations. For example, the management module 110 can generate and transmit task assignments 116 to the selected components to trigger completion of the relevant tasks. Each task assignment 116 can include one or more tasks to be completed by a particular component. For example, the tasks can be or include the retrieval, storage, replenishment, and/or the counting of inventory items and/or the management of the mobile drive units 102, inventory handlers 108, and/or components of the inventory system 100. Depending on the component and task to be completed, a particular task assignment 116 can identify locations, components, and/or actions associated with the corresponding task and/or any other appropriate information to be used by the relevant component in completing the assigned task.

Although shown in FIG. 1 as a single, discrete component, the management module 110 can represent multiple components and/or can represent or include portions of the mobile drive units 102 and/or other elements of the inventory system 100. Accordingly, any or all of the functionality of the management module 110 that is described herein may, in particular embodiments, represent functionality of a mobile drive unit 102 (e.g., a controller within the mobile drive unit 102).

In further embodiments, the management module 110 can select a mobile drive unit 102, inventory handler 108, or other unit of the inventory system 100 to assign the relevant task based on the location or state of the selected unit, an indication that the selected unit has completed a previously-assigned task, a predetermined schedule, and/or any other suitable consideration. These destinations can be associated with an inventory request that the management module 110 is executing and/or a management objective that the management module 110 is attempting to fulfill. For example, the task assignment can define the location of an inventory holder 104 to be accessed, an inventory handler 108 to be utilized, an inventory station 106 to be visited, a storage location where the mobile drive unit 102 should park until receiving another task, or a location associated with any other task appropriate based on the configuration, characteristics, and/or state of the inventory system 100, as a whole, or individual components of the inventory system 100.

As part of completing various task assignments 116, the mobile drive units 102 can move the inventory handlers 108 between locations within the workspace 112. For example, the mobile drive units 102 can couple with and transport the inventory handlers 108 within the workspace 112.

The management module 110 can communicate with various components of the inventory system 100. For example, the management module 110 can communicate to receive information identifying selected inventory handlers 108, to transmit the locations of the mobile drive units 102, to transmit image data for images of fiducials 114 captured by the mobile drive units 102, and/or to exchange any other suitable information to be used by the management module 110 the mobile drive units 102, and/or other elements of the inventory system 100 during operation. The management module 110 can communicate with the components of the inventory system 100 (e.g., the mobile drive units 102, inventory handlers 108, etc.) wirelessly, using wired connections, and/or in any other appropriate manner. Additionally or alternatively, the mobile drive units 102 can communicate with inventory handlers 108 and/or other components of the inventory system 100 and/or with one another wirelessly, using wired connections, and/or in any other appropriate manner.

In various embodiments, components of the inventory system 100 can communicate using IEEE 802.11, Bluetooth, or Infrared Data Association (IrDA) standards, or any other appropriate wireless communication protocol. Additionally or alternatively, the inventory system 100 can include tracks or other guidance elements upon which the mobile drive units 102 can be wired to facilitate communication between the mobile drive units 102, between the management module 110 and the mobile drive units 102, and/or between the components of the inventory system 100. In general, the mobile drive units 102 can be powered, propelled, and controlled in any manner appropriate based on the configuration and characteristics of the inventory system 100.

The inventory stations 106 can represent locations designated for the completion of particular tasks involving inventory items. For example, the tasks can include the removal of inventory items from the inventory handlers 108 and/or the inventory holders 104, the introduction of inventory items into the inventory handlers 108 and/or the inventory holders 104, the counting of inventory items in the inventory handlers 108 and/or the inventory holders 104, the decomposition of inventory items (e.g., separating from pallet-sized or case-sized groups into individual inventory items), the consolidation of inventory items between the inventory handlers 108 and/or the inventory holders 104, and/or the processing or handling of inventory items in any other suitable manner.

In some embodiments, one or more inventory stations 106 can represent a location at which the inventory system 100 is externally accessible by human operator(s) and/or robotic system(s) external to the inventory system 100. In some embodiments, the workspace 112 can be externally bounded by walls and/or a fence to prevent or limit access to the workspace 112 by human operator(s) (e.g., a structured environment), and each of the inventory stations 106 is arranged at a respective opening in the walls or fence. In some embodiments, the workspace 112 is not externally bounded (e.g., an unstructured environment). In further embodiments, the inventory system 100 can allow both mobile drive units 102 and human operator(s) to navigate through the workspace 112 and interact with various components of the inventory system 100.

The workspace 112 can include different floors 120. The floors 120 can be accessible by elevators or other forms of lifts 122. For example, the lifts 122 may be suitably sized for carrying mobile drive units 102 with coupled inventory handlers 108 among the floors 120. The floors 120 are shown with a ground floor and multiple upper floors, although subfloors below a ground floor or any other arrangement of floors may be utilized. In some embodiments, upper floors 120 may be formed by panels 124 that may be installed between portions of the inventory holders 104 (such as in cases where inventory holders 104 correspond to commodity shelving that may be pre-existing within a warehouse space and supported by pillars extending upward from a main floor).

In some embodiments, different zones or areas may be defined on different floors 120. A storage area 130 may correspond to an area in which inventory may be stored (e.g., in inventory holders 104) until retrieved for processing relative to received orders or other tasks. An order consolidation area 132 may correspond to an area that receives containers having items consolidated into groupings for fulfilling received orders. For example, in use, items may be retrieved from the storage area 130 by one or more inventory handlers 108, transported to stations 106 for aggregating into groupings suitable for fulfilling orders, and transported in those groupings by one or more inventory handlers 108 to the order consolidation area 132 to await shipping etc. Although FIG. 1 shows the storage area 130 distributed across the upper floors 120 while the order consolidation area 132 is shown on the ground floor 120, any suitable distribution of respective zones across floors 120 may be utilized. Moreover, the order consolidation area 132 and the storage area 130 may have similar or different shelving units or other structures relative to one another.

Turning to FIG. 2, a side view is shown illustrating examples of components and functions relative to an inventory holder 104, an inventory handler 108, and a mobile drive unit 102.

The mobile drive unit 102 can include a body 202 dimensioned to house various components and/or systems of the mobile drive unit 102. For example, the body 202 can include suitable panels or other structural members of any suitable materials to form a protective enclosure for the components and/or systems. The body 202 can house features such as a coupling system 208, a controller 212, a drive system 214, a power storage device 216 (e.g., a battery), one or more indicator lights 217, and/or one or more sensors 218. However, the body 202 can include and/or house any suitable mobile drive unit components.

The power storage device 216 can provide power to the coupling system 208, the controller 212, the drive system 214, the indicator lights 217, and/or the sensor(s) 218. For example, the power storage device 216 can include one or more battery modules that can provide power to the components of the mobile drive unit 102. In various embodiments, the power storage device 216 can include rechargeable battery packs. For example, mobile drive units 102 can engage with a docking system to recharge the battery packs. Additionally or alternatively the power storage device 216 can be removed and replaced with a fully charged power storage device 216.

The coupling system 208 can engage with the inventory handler 108. For example, the coupling system 208 may engage with the inventory handler 108 to allow the mobile drive unit 102 to move the inventory handler 108 (e.g., around the workspace 112). The coupling system 208 can additionally or alternatively allow the drive unit 102 to lift the inventory handler 108, propel the inventory handler 108, rotate inventory handler 108, and/or move the inventory handler 108 in any other appropriate manner. The coupling system 208 may include suitable connectors 220 or other structure to facilitate establishing communication of power, instructions, data etc. between the mobile drive unit 102 and the inventory handler 108. For example, the connectors 220 may engage suitable connectors 221 on the inventory handler 108. Non-limiting examples may include electrical contacts, pneumatic hose junctures, near field communication components, or other structures for establishing conduits of mediums for communication.

The coupling system 208 may include a coupling head 230 that may include any appropriate combination of components, such as ribs, spikes, and/or corrugations, to couple with, support, and/or facilitate manipulation of inventory handler 108 (such as lifting, propelling, rotating, moving, and/or actuating). For example, the coupling head 230 may include a high-friction portion that abuts a portion of the inventory handler 108 and provides frictional forces that may induce translational and rotational movement in the inventory handler 108 when the coupling head 230 moves and rotates, respectively. As a result, mobile drive unit 102 may be able to manipulate inventory handler 108 by moving or rotating the coupling head 230, either independently or as a part of the movement of mobile drive unit 102 as a whole.

The coupling system 208 may include a coupling actuator 232 that moves the coupling head 230 toward the inventory handler 108 to facilitate coupling of the mobile drive unit 102 and the inventory handler 108. The coupling actuator 232 may also be capable of adjusting the position or orientation of coupling head 230 in other suitable manners to facilitate coupling. The coupling actuator 232 may include any appropriate components, based on the configuration of mobile drive unit 102 and inventory handler 108, for moving the coupling head 230 or otherwise adjusting the position or orientation of coupling head 230. As non-limiting examples, the coupling actuator 232 may include a motorized shaft or screw drive attached to the coupling head 230 and operable to lift the coupling head 230 as appropriate for coupling with inventory handler 108.

The controller 212 can include one or more computer processors (also referred to as processors) and a memory. The one or more computer processors may be implemented in any suitable form, such as a general purpose microprocessor, an application-specific integrated circuit (ASIC), and so forth. The memory may include a variety of computer-readable media selected for their size, relative performance, or other capabilities: volatile and/or non-volatile media, removable and/or non-removable media, etc. The controller 212 can be configured to implement one or more techniques described herein for operating the inventory handler 108, for example.

The one or more sensors 218 can be or include sensors that can aid in navigation around the environment (e.g., around the workspace 112). The sensors 218 can be or include inertial sensors, navigational sensors, and so forth. In various embodiments, for example embodiments where the mobile drive unit 102 is operating in an unstructured field, the mobile drive unit 102 can be equipped with sensors 218 that can be used for navigation through the unstructured field. The sensors 218 can be part of an obstacle detection system that can detect obstacles (e.g., objects, individuals, and/or items in the workspace 112), physical barriers, fiducials 114, and/or other mobile drive units 102 within the environment (e.g., workspace 112). The sensors 218 can additionally or alternatively be or include visual sensors (e.g., cameras), ranging sensors (e.g., radar, lidar), proximity sensors, an impact sensor, a color sensor, a magnetic sensor, an electrical sensor, a cliff sensor, a brightness sensor, a spectrometer, a photometer, and/or any suitable sensors 218 for detecting obstacles and/or objects in the workspace 112.

In various embodiments, the sensor 218 can be or include a downward-facing camera configured to detect fiducials 114 (or fiducial markers) on the floor of the environment (e.g., workspace 112), e.g., to facilitate navigation of the mobile drive unit 102. In various embodiments, the sensor 218 can be or include an upward-facing camera configured to detect fiducials 114 (or fiducial markers) on underside of an inventory handler 108 (e.g., to facilitate appropriate operation of the coupling system 208 for coupling with the inventory handler 108). For ease of viewing, examples of fiducials 114 on a floor and underside are shown in FIG. 2 in relative positions that may be suitable for facilitating coupling with an inventory holder 104, although suitable locations relative to inventory handlers 108 and/or other components of the inventory system 100 may be utilized additionally or alternatively.

The controller 212 can receive sensor signals from the sensors 218 and perform processing on the sensor signals. For example, the computer processor(s) of the controller 212 can perform image processing on the sensor signals (e.g., images) received from the sensors 218 to detect obstacles, physical barriers, etc.

In further embodiments, the computer processor(s) of the controller 212 can perform navigation control based on the sensor signals (e.g., images) received from the sensors 218. As noted above, the workspace 112 associated with the inventory system 100 can include a number of fiducials 114 distributed to cover all or a portion of the workspace 112. In such embodiments, the sensors 218 can detect the fiducials within the field-of-view of the sensors 218 (e.g., on the floor of the workspace 112). The controller 212 can determine location information that includes a position and orientation of the mobile drive unit 102, via processing an image captured by the sensors 218 encompassing one or more of the fiducials 114. As a result, the controller 212 can maintain an accurate indication of the location and orientation of the mobile drive unit 102 to aid in navigation when moving the mobile drive unit 102 within the workspace 112. In some embodiments, the controller 212 can transmit the sensor signals from the sensors 218 to another computing system (e.g., management module 110), for example, to determine location information of the mobile drive unit 102. In this embodiment, the other computing system may transmit navigational commands to the mobile drive unit 102, based on the location information.

The controller 212 can generate one or more control signals for the drive system 214 to actuate the mobile drive unit 102 over the floor of the environment. The one or more control signals for the drive system 214 can be based on at least one of the sensor signals from the sensors 218. In some embodiments, the controller 212 can further receive sensor signals from a navigational sensor (which may be implemented in the mobile drive unit 102 or in an external computing device) and the one or more control signals for the drive system 214 can be further based on the sensor signals from the navigational sensor.

The drive system 214 can include a powertrain (e.g., electric motor(s) 222 and drivetrain components) (not shown) and wheels 224. In some embodiments, the mobile drive unit 102 can use differential steering to turn the mobile drive unit 102 without separately steering the wheels 224. For example, the mobile drive unit 102 may be able to perform neutral turns by rotating, within a pair of axially-aligned wheels, one wheel in a forward direction and the other wheel in a reverse direction. Further, in some embodiments, the mobile drive unit 102 may include one or more stabilizer wheels 234 that are not driven by the drive system 214.

In some embodiments, the mobile drive unit 102 can include one or more indicator lights 217 (e.g., located at any suitable location or combination of locations along the body 202). The controller 212 can selectively illuminate the indicator lights 217 of the mobile drive unit 102. The indicator lights 217 can convey any suitable information to human operators collocated within the environment. For example, the controller 212 can operate the indicator lights 217 to indicate that the mobile drive unit 102 is moving, a direction that the mobile drive unit 102 is moving, how fast the mobile drive unit 102 is moving, whether the mobile drive unit 102 is engaged with an inventory handler 108, whether the mobile drive unit 102 detects an obstacle, a physical barrier, and/or a fiducial 114, and so forth. The controller 212 can additionally or alternatively illuminate the indicator lights 217 in any manner suitable to convey the different information. For example, the controller 212 can control the colors displayed by the indicator lights 217, illumination patterns, and so forth.

The inventory holder 104 may correspond to a shelving unit and/or otherwise include a suitable frame 240 for supporting inventory items. The frame 240 can include legs 242 and storage shelves 244. The legs 242 may support the storage shelves 244. For example, the storage shelves 244 may be supported so that the storage shelves 244 are vertically distributed along the inventory holder 104.

In various embodiments (e.g., including embodiments in which inventory holders 104 are moveable by mobile drive units 102), the legs 242 may be sized to form device openings suitably sized to permit a mobile drive unit 102 to drive between the legs 242. The mobile drive unit 102 may utilize the coupling head 230 to engage a coupling surface (e.g., a load-bearing surface) of the frame 240 for lifting the inventory holder 104. For example, the load-bearing surface of the frame 240 may be positioned along an underside of a lowermost storage shelf 244 of the inventory holder 104. However, sizing, shape, and placement of the storage shelves 244 is not limited to determination based on size, shape, or other characteristics of a particular embodiment of a mobile drive unit 102 utilized. For example, in some embodiments, the inventory holder 104 may correspond to a shelving unit that is pre-existing or pre-installed in a workspace 112 that is subsequently retrofit to operate with mobile drive units 102 and/or other elements of the inventory system 100.

The inventory holder 104 may be formed from commodity shelving. For example, the legs 242 may include—or may be supported by—pillars 246. The pillars 246 may be supported by a main floor (e.g., a ground floor 120). The pillars 246 may extend upward from the main floor, for example. The pillars 246 may directly or indirectly support the storage shelves 244. In some embodiments, the pillars 246 may directly or indirectly support upper floors 120 of the inventory system 100. For example, at least some portion of the upper floors 120 may be formed by panels 124 that are mounted by suitable brackets 248 to the storage shelves 244 or otherwise connected by suitable fixtures to be supported by the pillars 246 so that the mobile drive units 102 have a suitable driving surface among the inventory holders 104 at different vertical positions along the inventory holders 104. The panels 124 may be perforated or otherwise constructed to provide suitable strength to weight ratios.

Each storage shelf 244 may be suitably sized and/or otherwise configured to receive and support any suitable number of items. Items are represented as containers 109 in FIG. 2, although non-containerized items may be utilized additionally or alternatively. For simplicity however, discussion herein may refer to containers and items interchangeably. As an illustrative example, the top-most storage shelf 244 along its depth in FIG. 2 is shown bearing three containers 109 (e.g., which may have form factors of totes), although storage shelves 244 may be sized to include one, two, three, or more containers 109 in a depth direction. The storage shelf 244 may be sized for holding containers 109 end to end and/or side to side along the depth of the storage shelf 244. Containers 109 arranged end to end may include longest dimensions of the containers 109 arranged substantially along the depth direction (such as on the third storage shelf 244 from the top in FIG. 2). Containers 109 arranged side to side may correspond to longest dimensions of the containers 109 arranged to be substantially parallel to one another and/or perpendicular to the depth direction (such as on the first storage shelf 244 from the top in FIG. 2). Arranging containers 109 to be organized side to side along the depth direction may allow greater density of storage of containers 109 in the depth direction compared to arranging end to end in the depth direction.

A respective group of containers 109 may be positioned so that one is located at a distal position on the storage shelf 244 (e.g., farther from the inventory handler 108), while the other is located at a proximal position on the storage shelf 244 (e.g., closer or nearer to the inventory handler 108). For example, containers 109 may be arranged so that the proximal position is a front position and so that the distal position is a rear position. One or more containers 109 may be positioned between the proximal and distal positions.

The inventory handler 108 may be capable of removing a container 109 from the storage shelf 244 and/or depositing a container 109 onto the storage shelf 244. In use, the inventory handler 108 may be capable of accessing the distal position (as illustrated by arrow 249A) and the proximal position (as illustrated by arrow 249B) for removing or depositing containers 109 on the storage shelf 244. In some embodiments, the inventory handler 108 may also be capable of accessing a position between the proximal and distal positions (as illustrated by arrow 249C). The inventory handler 108 may include suitable structure for the function of accessing containers 109 and/or other items among different positions of the storage shelf 244. Although the inventory handler 108 is represented as a functional block in FIG. 2, various examples of structure that may be included in the inventory handler 108 are shown and described in greater detail with respect to FIGS. 5 through 14. Additionally, although in some embodiments the inventory handler 108 and the inventory holder 104 may be releasably coupleable with a mobile drive unit 102, in other embodiments the mobile drive unit 102 may be permanently coupled and/or elements of the mobile drive unit 102 may be otherwise incorporated into the inventory handler 108 and/or inventory holder 104 to enable associated functions thereof.

Figure 3:
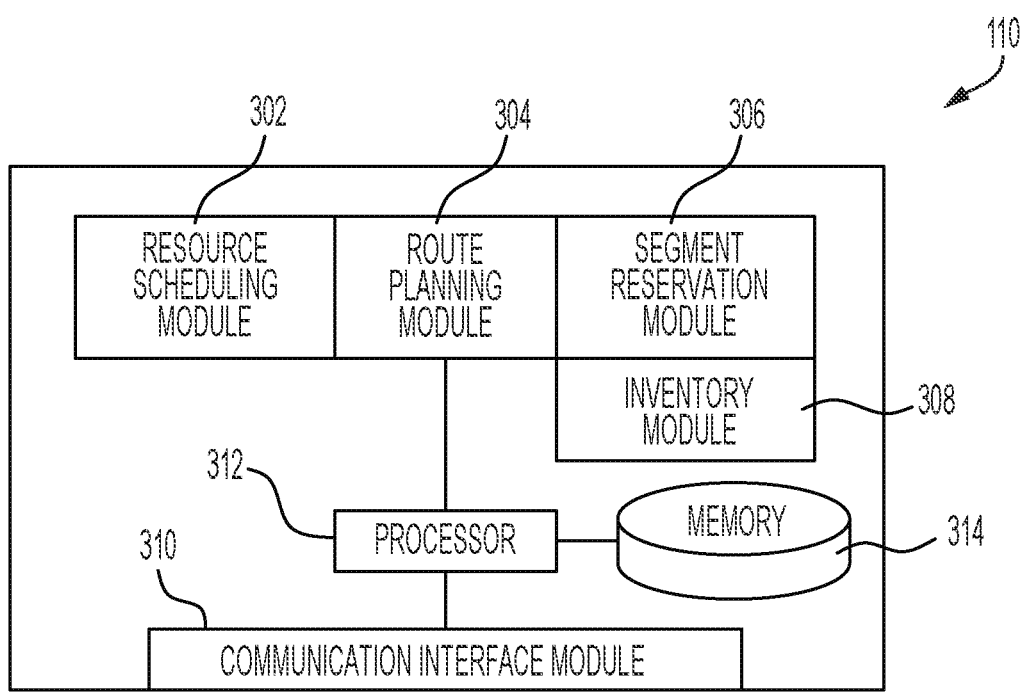
FIG. 3 is a block diagram illustrating an example of a management module that may be utilized in the inventory system shown in FIG. 1 in accordance with various embodiments.

Turning to FIG. 3, a particular embodiment of the management module 110 is shown in greater detail that may be utilized in particular embodiments of the system or architecture shown in FIG. 1. As shown, the example embodiment includes a resource scheduling module 302, a route planning module 304, a segment reservation module 306, an inventory module 308, a communication interface module 310, a processor 312, and a memory 314. The management module 110 can represent a single component, multiple components located at a central location within inventory system 100, or multiple components distributed throughout inventory system 100. For example, the management module 110 may represent components of one or more mobile drive units 102 that are capable of communicating information between the mobile drive units 102 and coordinating the movement of mobile drive units 102 within workspace 112. In general, management module 110 may include any appropriate combination of hardware and/or software suitable to provide the described functionality.

The processor 312 is operable to execute instructions associated with the functionality provided by management module 110. The processor 312 can comprise one or more general purpose computers, dedicated microprocessors, or other processing devices capable of communicating electronic information. Examples of the processor 312 include one or more application-specific integrated circuits (ASICs), field programmable gate arrays (FPGAs), digital signal processors (DSPs) and any other suitable specific or general purpose processors.

The memory 314 can store processor instructions, inventory requests, reservation information, state information for the various components of inventory system 100 and/or any other appropriate values, parameters, or information utilized by management module 110 during operation. The memory 314 can represent any collection and arrangement of volatile or nonvolatile, local or remote devices suitable for storing data. Examples of the memory 314 may include, but are not limited to, random access memory (RAM) devices, read only memory (ROM) devices, magnetic storage devices, optical storage devices or any other suitable data storage devices.

The resource scheduling module 302 can process received inventory requests and generate one or more assigned tasks to be completed by the components of inventory system 100. The resource scheduling module 302 can additionally or alternatively include one or more appropriate components for completing the assigned tasks and, using communication interface module 310, communicate the assigned tasks to the relevant components. Additionally, the resource scheduling module 302 can also be responsible for generating assigned tasks associated with various management operations, such as prompting the mobile drive units 102 to move to a calibration region for calibration of the sensors 218, to recharge the power storage device 216 and/or have power storage device 216 replaced, to instruct inactive mobile drive units 102 to park in a location outside the anticipated traffic flow or a location near the anticipated site of future tasks, and/or to direct the mobile drive units 102 selected for repair or maintenance to move towards a designated maintenance station.

The route planning module 304 receives route requests from mobile drive units 102. These route requests identify one or more destinations associated with a task the requesting mobile drive unit 102 is executing. In response to receiving a route request, the route planning module 304 can generate a path to one or more destinations identified in the route request. The route planning module 304 may implement any appropriate algorithms utilizing any appropriate parameters, factors, and/or considerations to determine the appropriate path. After generating an appropriate path, the route planning module 304 can transmit a route response identifying the generated path to the requesting mobile drive unit 102 using, using for example, the communication interface module 310.

The segment reservation module 306 can receive reservation requests from mobile drive units 102 attempting to move along paths generated by the route planning module 304. These reservation requests request the use of a particular portion of workspace 112 (referred to herein as a "segment") to allow the requesting mobile drive unit 102 to avoid collisions with other mobile drive units 102 while moving across the reserved segment. In response to received reservation requests, the segment reservation module 306 can transmit a reservation response granting or denying the reservation request to the requesting mobile drive unit 102 using the communication interface module 310.

The inventory module 308 can maintain information about the location and number of items in the inventory system 100. Information can be maintained about the number of items in a particular inventory holder 104 and/or inventory handler 108 and the maintained information can include the location of those items in the inventory holder 104 and/or inventory handler 108. The inventory module 308 can also communicate with the mobile drive units 102, utilizing task assignments 116 to maintain, replenish or move items within the inventory system 100.

The communication interface module 310 can facilitate communication between management module 110 and other components of inventory system 100, including reservation responses, reservation requests, route requests, route responses, and task assignments. These reservation responses, reservation requests, route requests, route responses, and task assignments may represent communication of any form appropriate based on the capabilities of management module 110 and may include any suitable information. Depending on the configuration of management module 110, the communication interface module 310 can be responsible for facilitating either or both of wired and wireless communication between the management module 110 and the various components of inventory system 100. In particular embodiments, the management module 110 can communicate using communication protocols such as 802.11, Bluetooth, or Infrared Data Association (IrDA) standards. Furthermore, the management module 110 can, in particular embodiments, represent a portion of mobile drive unit 102 or other components of inventory system 100. In such embodiments, the communication interface module 310 can facilitate communication between management module 110 and other parts of the same system component.

In general, the resource scheduling module 302, the route planning module 304, the segment reservation module 306, the inventory module 308, and the communication interface module 310 can each represent any appropriate hardware and/or software suitable to provide the described functionality. In addition, as noted above, the management module 110 may, in particular embodiments, represent multiple different discrete components and any or all of the resource scheduling module 302, the route planning module 304, the segment reservation module 306, the inventory module 308, and the communication interface module 310 can represent components physically separate from the remaining elements of management module 110. Moreover, any two or more of the resource scheduling module 302, the route planning module 304, the segment reservation module 306, the inventory module 308, and the communication interface module 310 can share common components. For example, in particular embodiments, the resource scheduling module 302, the route planning module 304, the segment reservation module 306, and the inventory module 308 can represent computer processes executing on the processor 312 and the communication interface module 310 comprises a wireless transmitter, a wireless receiver, and/or a related computer process executing on the processor 312.

Figure 4:
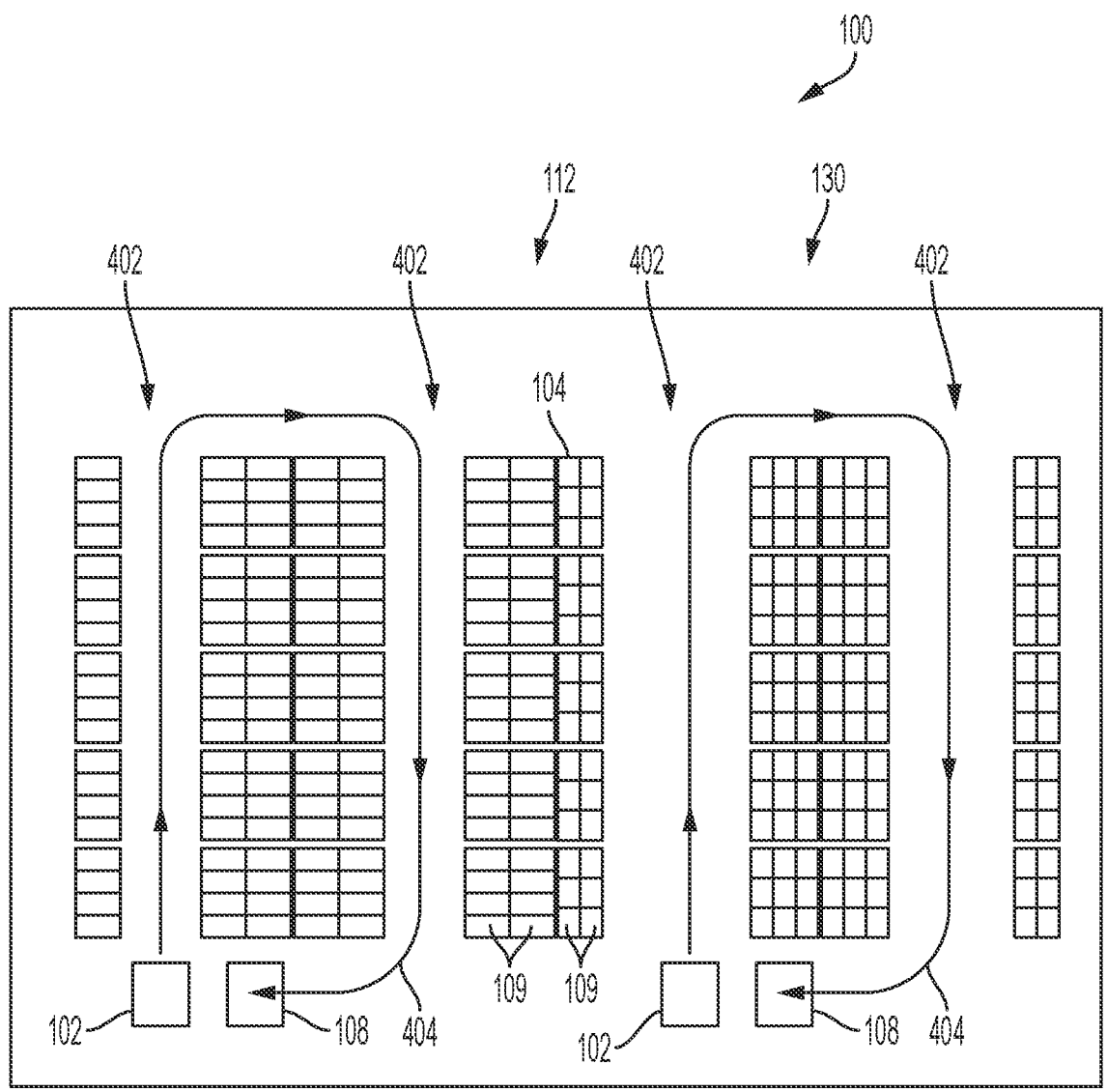
FIG. 4 is a top view illustrating an examples of routing within the inventory system shown in FIG. 1 in accordance with various embodiments.

Turning to FIG. 4, FIG. 4 is a top view illustrating an example of routing within the inventory system 100. Within a storage area 130, the inventory holders 104 may be arranged to define aisles 402. The aisles 402 may be sized to accommodate a width of a single mobile drive unit 102 with accompanying payload such as an inventory handler 108. To facilitate traffic flow, the aisles 402 may be arranged to include one-way aisles. For example, potential drive paths are illustrated in FIG. 4 by arrows 404. In various examples, using aisles that are sized to be single width and/or one-way can allow for inventory holders 104 to be arranged with a greater density than other arrangements. However, aisles may be configured to be two-way in traffic flow and/or may be sized to allow multiple mobile drive units 102 and/or inventory handlers 108 to travel side by side and/or past one another.

In various examples, the inventory holders 104 are arranged so that containers 109 are arranged six deep between aisles 402. For example, a six deep arrangement may allow an inventory handler 108 to access three of the six containers from one aisle 402 and the other three of the six containers from an adjacent aisle 402 and/or otherwise contribute to density that can be achieved on a given floor 120 and/or within the workspace 112. Arrangements are not limited to six deep, however, and can include more or less and/or may be mixed in how many containers 109 are arranged between aisles and/or in orientations of containers 109 relative to aisles (e.g., whether end to end or side to side), such as may be appreciated with the variety of illustrative examples depicted in FIG. 4.

Figure 5:
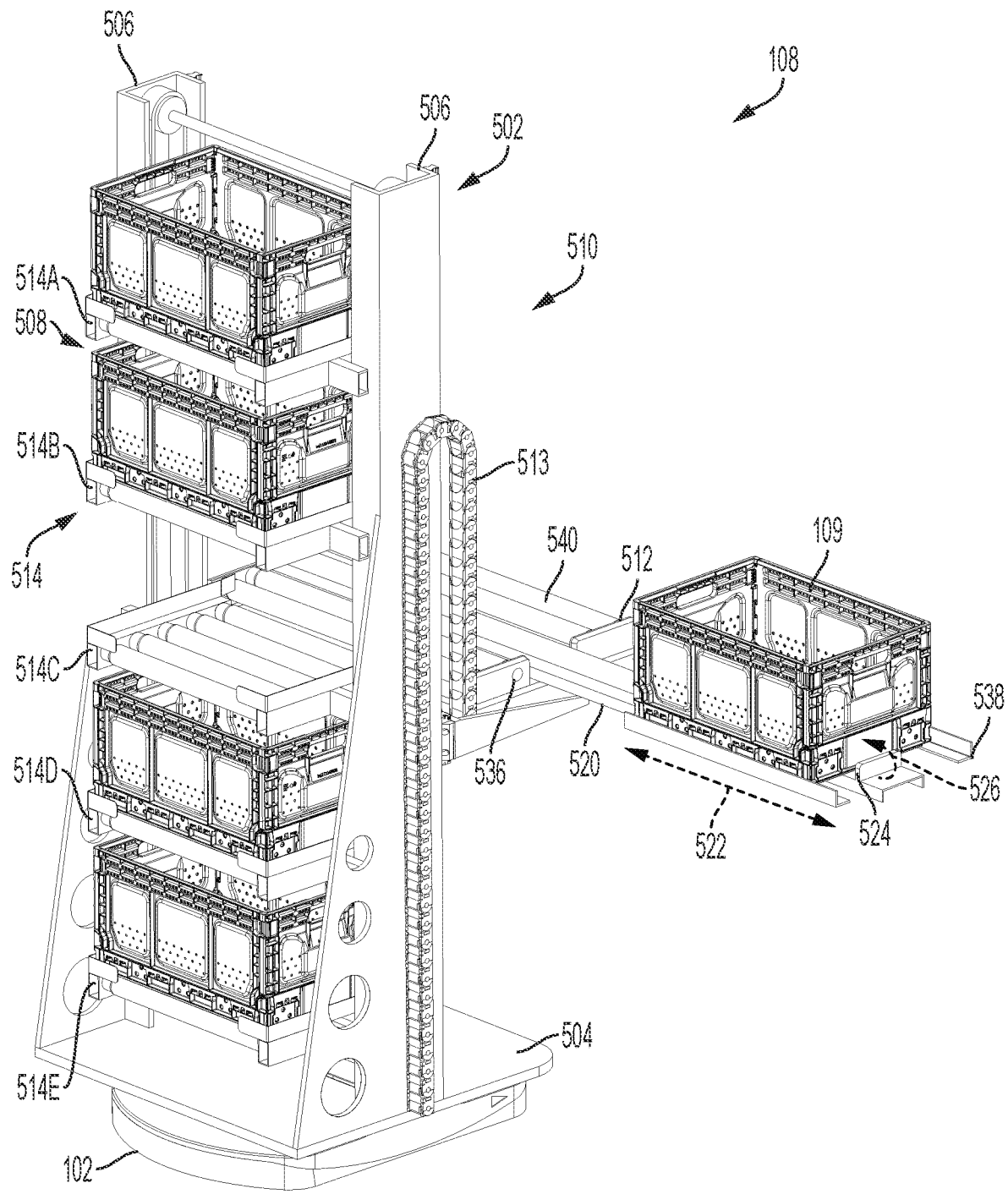
FIGS. 5 through 14 show perspective views of examples of inventory handlers that may be utilized in the inventory system shown in FIG. 1 in accordance with various embodiments.
Figure 6:
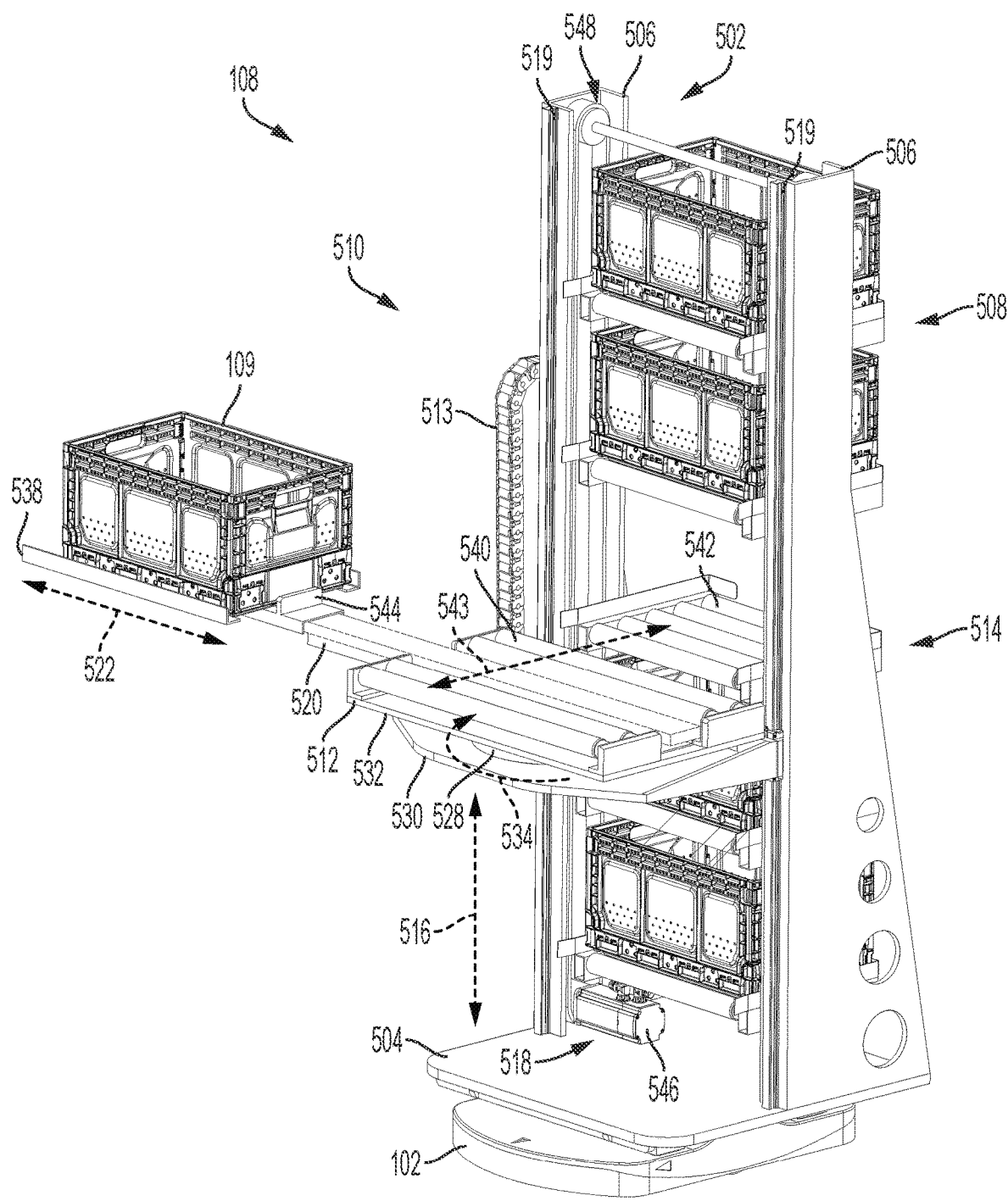

FIGS. 5 and 6 show an example of an inventory handler 108. FIG. 5 shows a rear perspective view, and FIG. 6 shows a front perspective view.

The inventory handler 108 can include a frame 502. The frame 502 can include a base 504. The base 504 may be suitably sized to be supported by a mobile drive unit 102. The base 504 may include suitable interfaces for coupling with the mobile drive unit 102, e.g., for transfer of power, instructions, data etc. between the mobile drive unit 102 and the inventory handler 108. For example, the base 504 may include connectors 221 as described with respect to FIG. 2.

The frame 502 can include at least one upright 506. The upright 506 may correspond to a vertical frame member, for example, although the upright 506 may be positioned to extend at an angle other than purely vertical from the base 504. The upright 506 may extend upward from the base 504. Sides of the inventory handler 108 may be defined relative to the upright 506. For example, the upright 506 can define a first lateral side 508 opposite a second lateral side 510. The mobile drive unit 102 may be configured for driving in a forward direction and/or in a backward direction, relative to which the left and right directions may be lateral, for example.

The inventory handler 108 can include a platform 512 and a plurality of staging shelves 514. The plurality of staging shelves 514 can be arranged along the first lateral side 508 of the frame 502, and the platform 512 can be arranged along the second lateral side 510 of the frame 502.

Five total staging shelves 514 are shown in FIGS. 5 and 6 (individually labeled 514A, 514B, 514C, 514D, and 514E), although any number of two or more may be utilized. The staging shelves 514 may be supported by the frame 502 and may be arranged above one another. For example, the first staging shelf 514A may be arranged above the second staging shelf 514B, which may be arranged above the third staging shelf 514C, and so on. The staging shelves 514 may be sized for receiving containers 109.

The platform 512 may be raisable and lowerable along the second lateral side 510 of the frame 502 (e.g., as illustrated by arrow 516). For example, the platform 512 may be coupled with a hoist 518. In FIGS. 5 and 6, the hoist 518 is depicted as including a motor 546 and belt 548 operable to reposition the platform 512, although the hoist 518 may include a chain that is electronically actuatable to change a position at which links of the chain bend or are arranged in a straight orientation, a pulley, a linear actuator, or any other structure suitable for changing a vertical position of the platform 512. In some aspects, the platform may be coupled with a flexible conduit 513 that can flex to bend to reach different heights while maintaining a protective enclosure around wiring and/or other conduits. The platform 512 may travel in, on, or along a track 519 or any other suitable structure for defining a path of the platform 512.

The platform 512 may support a telescoping arm 520. The telescoping arm 520 can be extendable and/or retractable relative to the platform 512 (e.g., as illustrated by arrow 522). In use, the telescoping arm 520 may be extendable from the platform 512 for engaging a container 109 and retractable toward the platform 512 for moving the container 109 onto the platform 512. In various examples, the telescoping arm 520 is sized to extend sufficiently to at least two container, tote, or item lengths, e.g., which may facilitate engaging a container 109 in a distal or proximal position on a storage shelf. 244 (e.g., FIG. 2).

The telescoping arm 520 may be coupled with a hook 524. The hook 524 may be arranged to pull the container 109 onto the platform 512 during retraction of the telescoping arm 520. In various examples, the hook 524 is collapsible to a stowed position to facilitate passage under the container 109 during extension of the arm 520. For example, the hook 524 may be hinged and pivotable by a suitable actuator to cause the hook 524 to rotate upward (e.g., as illustrated by arrow 526) from the stowed position and to a deployed position. However, the hook 524 may be linearly or otherwise movable between the deployed and stowed positions.

In various embodiments, the telescoping arm 520 may be coupled with a rotatable hub 528. For example, the rotatable hub 528 may be mounted on the platform 512 (e.g., on a lower portion 530 of the platform 512) and positioned to rotate a portion of the platform 512 that includes or supports the telescoping arm 520 (e.g., an upper portion 532 of the platform 512). The rotatable hub 528 may be rotatable (e.g., as illustrated by arrow 534). In some embodiments, the rotatable hub 528 may be capable of rotating the telescoping arm 520 by approximately 180 degrees between one orientation that can access a container 109 on a left side of an aisle 402 and another orientation that can access a container 109 on a right side of an aisle 402 without rotating an entirety of the inventory handler 108. In some embodiments, the telescoping arm 520 may be capable of extending in either direction (or include a set of components separately extendable in either direction) to permit access to right or left side of an aisle without rotating the inventory handler 108. In some examples, rotation from the rotatable hub 528 may facilitate fine angular adjustment of the telescoping arm 520. For example, the rotatable hub 528 may allow the telescoping arm 520 to shift in orientation to align with a depth of the container 109 to accommodate variations in how the container 109 may be positioned on the storage shelf 244.

In various embodiments, at least one sensor 536 may be included. The sensor 536 may provide information useful for aligning with and/or otherwise facilitating actions relative to containers 109 to be handled by the inventory handler 108. The sensor 536 is shown in FIG. 5 at a front of the platform 512, although any other suitable position may be used for detecting a container 109, arrangement of the telescoping arm 520, or other component to be involved in actions to be performed by the inventory handler 108. The sensor 536 may include any suitable type of sensor, e.g., which may include sensor types described elsewhere herein.

In some embodiments, alignment of the container 109 may be facilitated by guides 538. The guides 538 may be mounted on or otherwise located on the storage shelf 244 (e.g., FIG. 2). For example, the guides 538 may correspond to rails (e.g., L-shaped) or other structures that may guide the container 109 during movement of the container 109 onto and/or off from the storage shelf 244. In some embodiments, inclusion of the guides 538 may reduce a variation of orientations in which the containers 109 may be positioned on the storage shelves 244, e.g., which may simplify alignment processes and avoid complexity of components for accounting for variations that may otherwise occur.

A conveyor 540 may be borne by the platform 512. The conveyor 540 may be aligned for conveying from the platform 512 and toward the first lateral side 508 (e.g., as illustrated by arrow 543). The conveyor 540 may facilitate movement of the container 109 from the platform 512 to any of the staging shelves 514 in use (e.g., after vertically moving the platform 512 to align with the respective target or selected staging shelf 514). The conveyor 540 may move the container 109 from the platform 512 and between the uprights 506 to reach the staging shelf 514, for example. Movement from conveyor 540 in some examples additionally or alternatively may include movement away from the first lateral side 508. For example, the conveyor 540 may move the container 109 off of the platform 512 to transfer the container 109 off of the inventory handler 108 and to other element of the inventory system 100.

The conveyor 540 may be aligned for movement of containers 109 in a direction non-parallel to a direction of extension and retraction of the telescoping arm 520. For example, the platform 512 may be arranged to receive the container 109 in a first orientation from the telescoping arm 520 (e.g., with a long side of the container 109 aligned substantially parallel along a long side of the platform 512), and the conveyor 540 may be arranged to laterally translate the container 109 without rotating the container 109 from the first orientation (e.g., so that the long side of the container 109 remains aligned substantially parallel along the long side of the platform 512).

The conveyor 540 is depicted in FIGS. 5 and 6 as rollers, e.g. which may be arranged on either side of a space in which the telescoping arm 520 may fit when retracted. However, the conveyor 540 may include any combination of driven or non-driven rollers, belts, rams, or any other combination of suitable structure for performing the functions of the conveyor 540.

An offloader 542 can be included for any given staging shelf 514. The offloader 542 may be capable of moving a container 109 off of the staging shelf 514. Movement from the offloader 542 may include movement toward the second lateral side 510. For example, the offloader 542 may move the container 109 from the staging shelf 514 and offload to the platform 512 (e.g., as illustrated by arrow 543). Movement from the offloader 542 in some examples additionally or alternatively may include movement away from the second lateral side 510. For example, the offloader 542 may be utilized to help pull the container 109 onto the staging shelf 514 and offload from the platform 512, or the offloader 542 may offload the container 109 from the inventory handler 108 to other elements of the inventory system 100. The offloader 542 as depicted includes at least one roller (which may include at least one driven roller and may be supplemented by one or more non-driven rollers), although the offloader 542 can include any combination of belts, rollers, rams, or any other suitable combination of suitable structure for performing the functions of the offloader 542.

A finger or other projection 544 may be coupled with the telescoping arm 520. The projection 544 may be arranged to sit behind the container 109 in use. For example, when the telescoping arm 520 is in a retracted state, the projection 544 may be in a suitable position to allow a container 109 to be moved from a staging shelf 514 onto the platform 512 and into a position in front of the projection 544. During extension of the telescoping arm 520, the projection 544 may engage the container 109 and push the container 109 forward, e.g., off of the platform 512 and/or onto a storage shelf 244 or other structure of the inventory system 100. The projection 544 may be positioned at a distance away from the hook 524 that is at least as large as a predetermined size of the container 109. In use, telescoping arm 520 may either use the hook 524 to pull the container from the storage shelf 244 or use the projection 544 to push the container 109 onto the storage shelf 244, e.g., depending on the operation mode of the inventory handler 108.

Any suitable structure can be utilized for providing control and/or power to components of the inventory handler 108. For example, the mobile drive unit 102 may be configured for providing power and/or control that may be selectively distributed through a clutch system to any of the offloader 542, the conveyor 540, the rotatable hub 528, telescoping arm 520, or other component of the inventory handler 108, although any other arrangement of shared or designated control- or power-providing components may be utilized.

Figure 7:
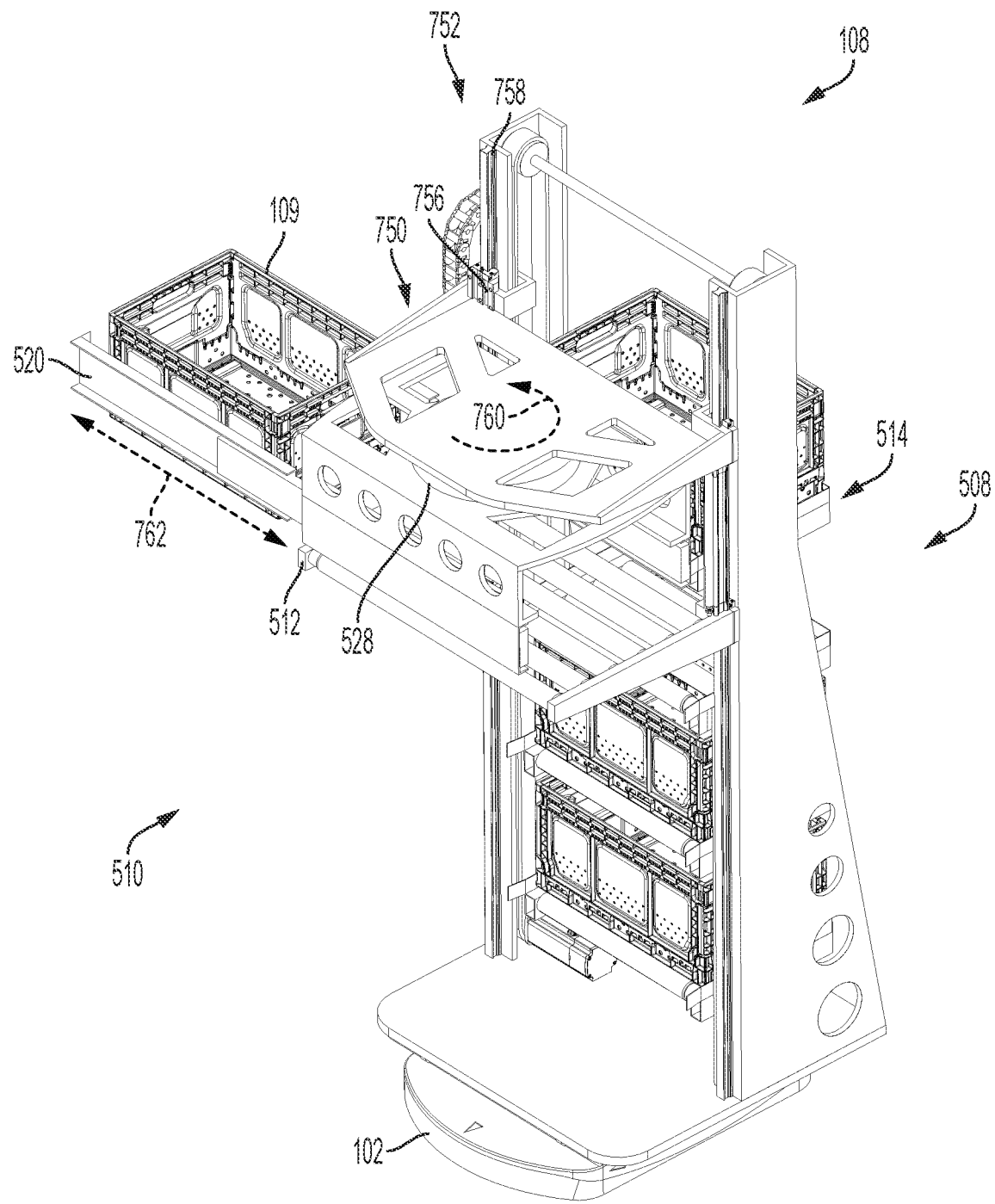
Figure 8:
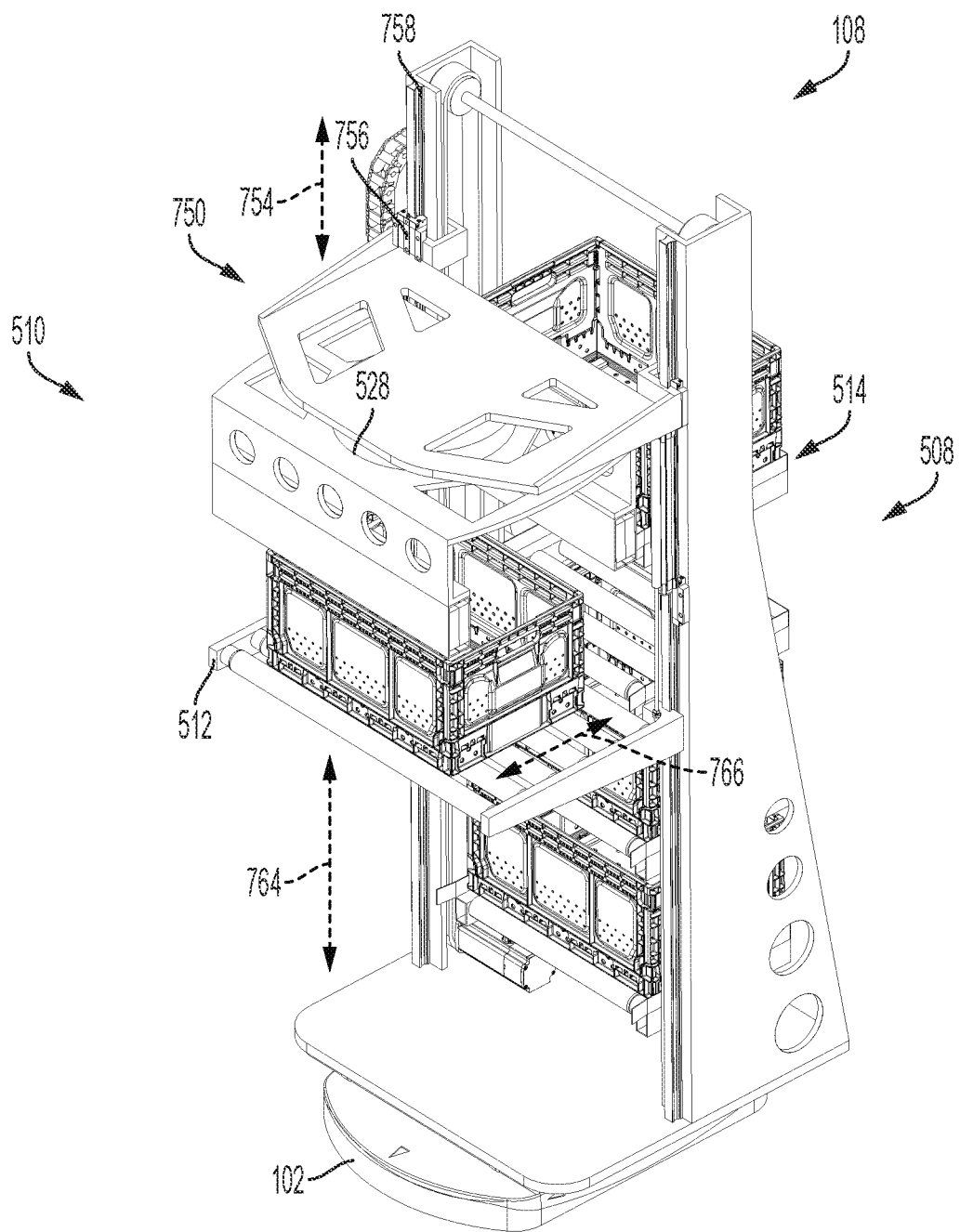

FIGS. 7 and 8 show another example of an inventory handler 108. The inventory handler 108 in FIGS. 7 and 8 can include features similar to those described with respect to FIGS. 5 and 6. For conciseness, description of such features will not be repeated. FIG. 7 shows the inventory handler 108 in a state in which a container 109 is off the platform 512, and FIG. 8 shows a state in which a container 109 is on the platform 512.

Different from the inventory handler 108 in FIGS. 5 and 6, the inventory holder in FIGS. 7 and 8 can include an overhead carrier 750. The overhead carrier 750 may be raisable and lowerable along the second lateral side 510 independent of the vertical position of the platform 512. For example, the overhead carrier 750 can include a secondary hoist 752 that can raise or lower the overhead carrier 750 (e.g., as illustrated by arrow 754). The secondary hoist 752 is depicted as a trolley 756 that can climb along a track 758, although any other structure capable of changing an elevation of the overhead carrier 750 may be utilized. The overhead carrier 750 may be supported by the platform 512 (e.g., the track 758 may be mounted on the platform 512) or may be supported separate from the platform 512 (e.g., the track may be mounted on the upright 506 separate from the platform 512).

The overhead carrier 750 may bear various components in lieu of the platform 512. For example, the overhead carrier 750 may bear the telescoping arm 520. The telescoping arm 520 is depicted in FIG. 7 as arranged to extend along a side of the container 109 (in contrast to the arrangement underneath the container 109 in FIGS. 5 and 6), although any position along a top, bottom, or side of the container 109 may be utilized in the inventory handler 108. The inventory handler 108 may include a pair of telescoping arms 520, e.g., so that the container 109 can be gripped from along both lateral sides for additional stability during extension and/or retraction.

As a further example, the overhead carrier 750 may bear the rotatable hub 528 from above. The rotatable hub 528 may be rotatable (e.g., as illustrated by arrow 760), e.g., which may facilitate similar functionality to that described in FIGS. 5 and 6.

In operation, the telescoping arm(s) 520 may extend and retract (e.g., as illustrated by arrow 762) to pull a container 109 onto the platform 512. The platform 512 can separate from the overhead carrier 750, e.g., by movement of the overhead carrier 750 (as illustrated by arrow 754) and/or by movement of the platform 512 (as illustrated by arrow 764). With the platform 512 suitably spaced from the overhead carrier 750, the conveyor 540 may move the container 109 onto a staging shelf 514 (e.g., as illustrated by arrow 766, which may correspond to movement underneath a lowermost extremity of the overhead carrier 750). Similarly, movement of the container 109 may occur from the staging shelf 514 onto the platform 512 or in other manners described herein for removing and/or moving the container 109 relative to the inventory handler 108.

Figure 9:
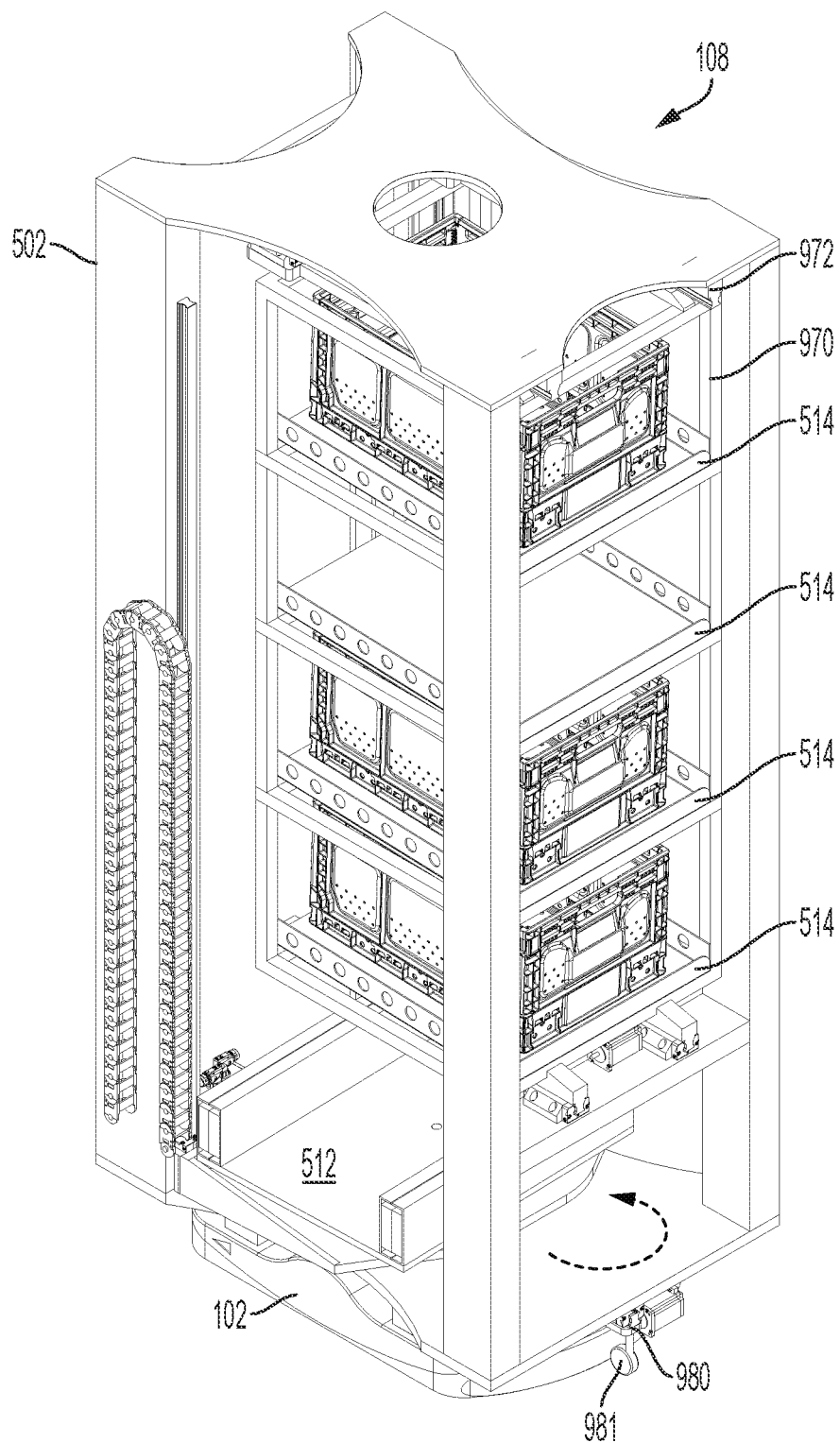
Figure 10:
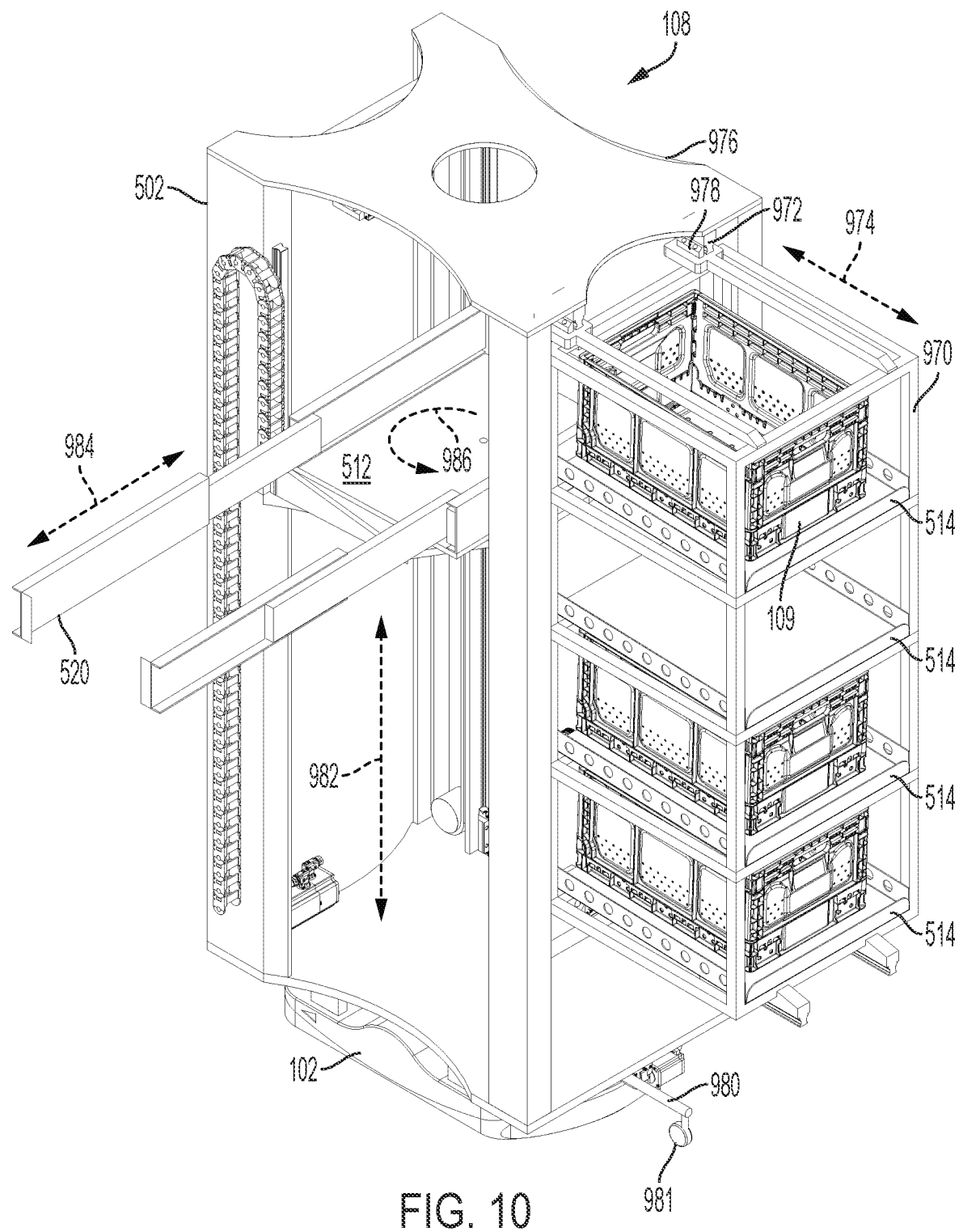

FIGS. 9 and 10 show another yet example of an inventory handler 108. The inventory handler 108 in FIGS. 9 and 10 can include features similar to those described with respect to FIGS. 5 through 6 and/or 7 through 8. For conciseness, description of such features will not be repeated. FIG. 9 shows the inventory handler 108 in a state suitable for transport, and FIG. 10 shows a state suitable for loading.

Different from the inventory handler 108 in FIGS. 5 through 6 and/or 7 through 8, the inventory holder in FIGS. 7 and 8 can include the staging shelves 514 within a deployable chassis 970. The deployable chassis 970 may be arranged over the platform 512 in a transport state of the inventory handler 108 (e.g., as depicted in FIG. 9). The deployable chassis 970 can be mounted on sliding rails 972. The sliding rails 972 may allow the deployable chassis 970 to move from a position at least partially within the frame 502 to a position at least partially out of the frame 502 of the inventory handler 108 (e.g., as illustrated by arrow 974 in FIG. 10). The sliding rails 972 may be mounted to an underside of a ceiling 976 of the frame 502, for example. The deployable chassis 970 may driven along the sliding rails 972 by a shuttle 978 or other actuator.

The inventory handler 108 may further include a stabilizer leg 980. The stabilizer leg 980 may be capable of extending below the deployable chassis 970 in the loading state (e.g., FIG. 10) and may be capable of retracting toward and/or into the frame 502 for the transport state (e.g., FIG. 9), e.g., in response to a suitable actuator. The stabilizer leg 980 may include a stabilizer wheel 981 that may roll along the ground during deployment or stowing of the stabilizer leg 980.

In operation, the inventory handler 108 may be carried by a mobile drive unit 102 in a transport state (e.g., FIG. 9). Upon reaching a target location, the inventory handler 108 may shift to a loading state (e.g., FIG. 10), such as by deploying the deployable chassis 970 and the stabilizer leg 980. The platform 512 may raise to a suitable position in the space vacated by the deployable chassis 970 (e.g., as illustrated by arrow 982), extend and retract the telescoping arm(s) 520 to transfer a container 109 onto the platform 512 (e.g., as illustrated by arrow 984), and raise or lower the platform 512 to a suitable position to align with a staging shelf 514 (e.g., as illustrated by arrow 982). Once aligned with the staging shelf 514, the container 109 may be moved from the platform 512 to the staging shelf 514. For example, the platform 512 may be rotated via the rotatable hub 528 (e.g., as illustrated by arrow 986) to align with the selected staging shelf 514 and using the telescoping arm 520 for transferring the container 109. As an alternative, the platform 512 may be configured similar to shown in FIGS. 5 and 6 and use the telescoping arm 520 from underneath before transferring to the staging shelf 514 via the conveyor 540. Containers 109 may also be individually moved from staging shelves 514 and off of the inventory handler 108 through usage of the platform 512 and associated components in a progression in reverse order from that just described.

Figure 11:
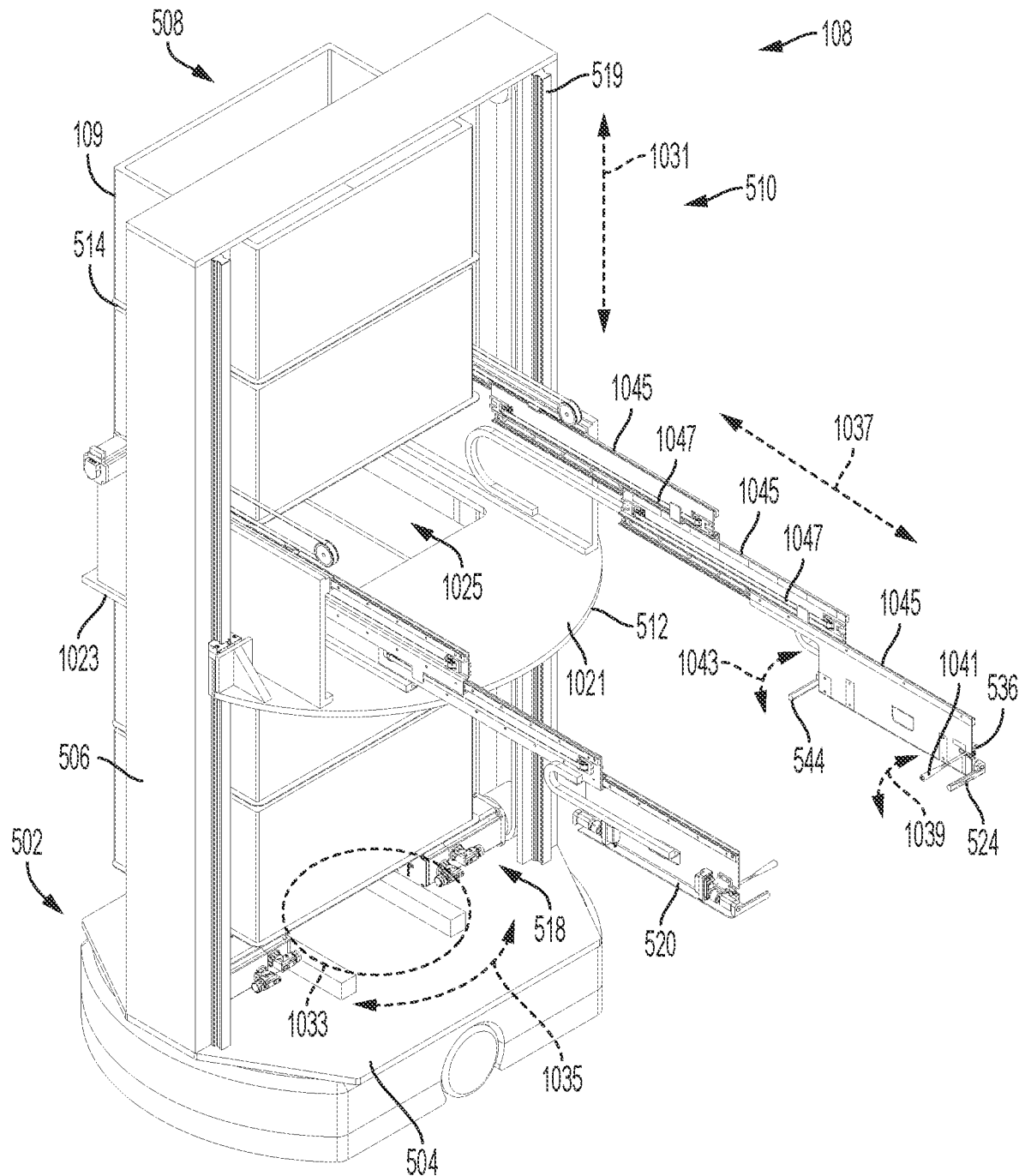
Figure 12:
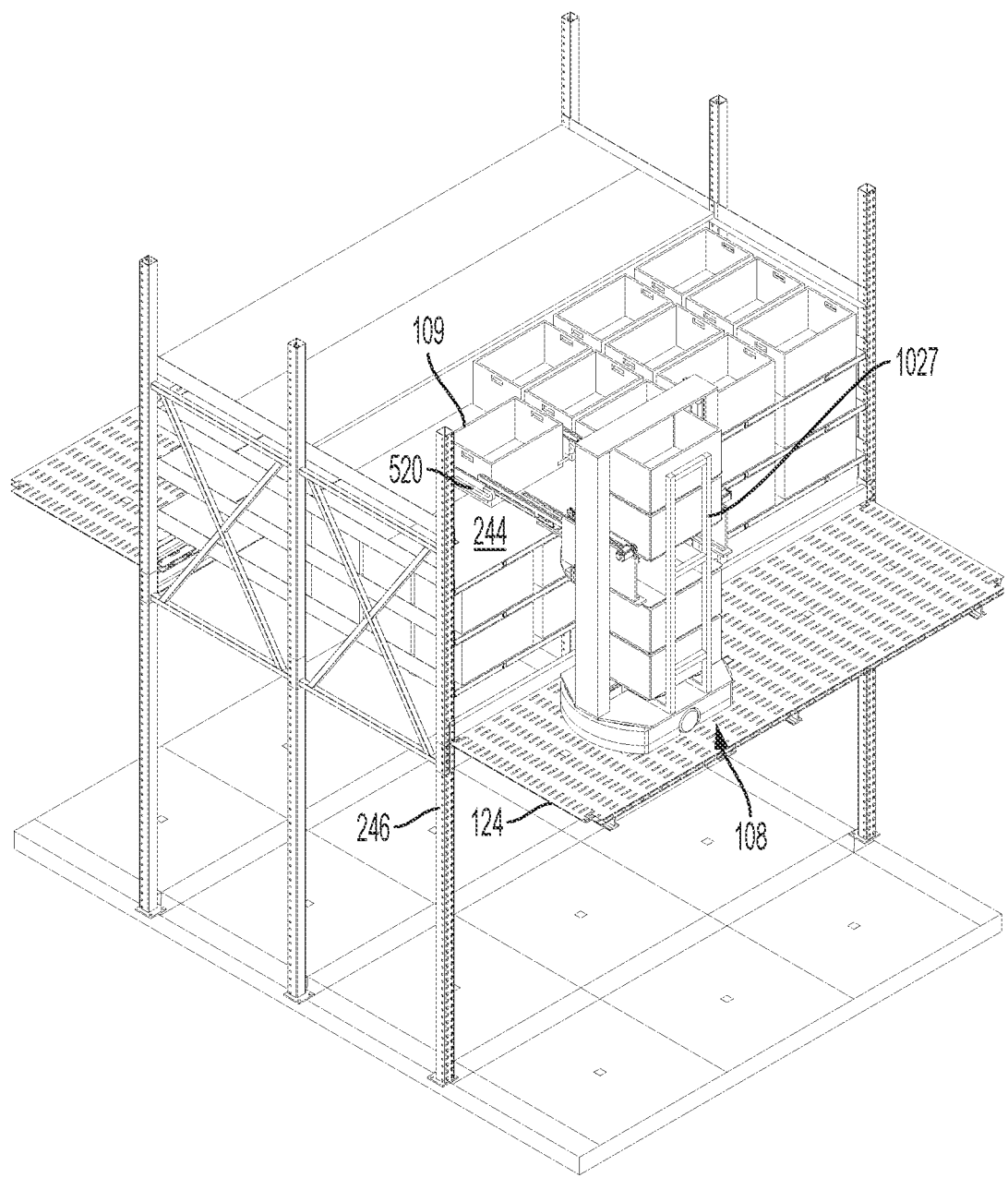
Figure 13:
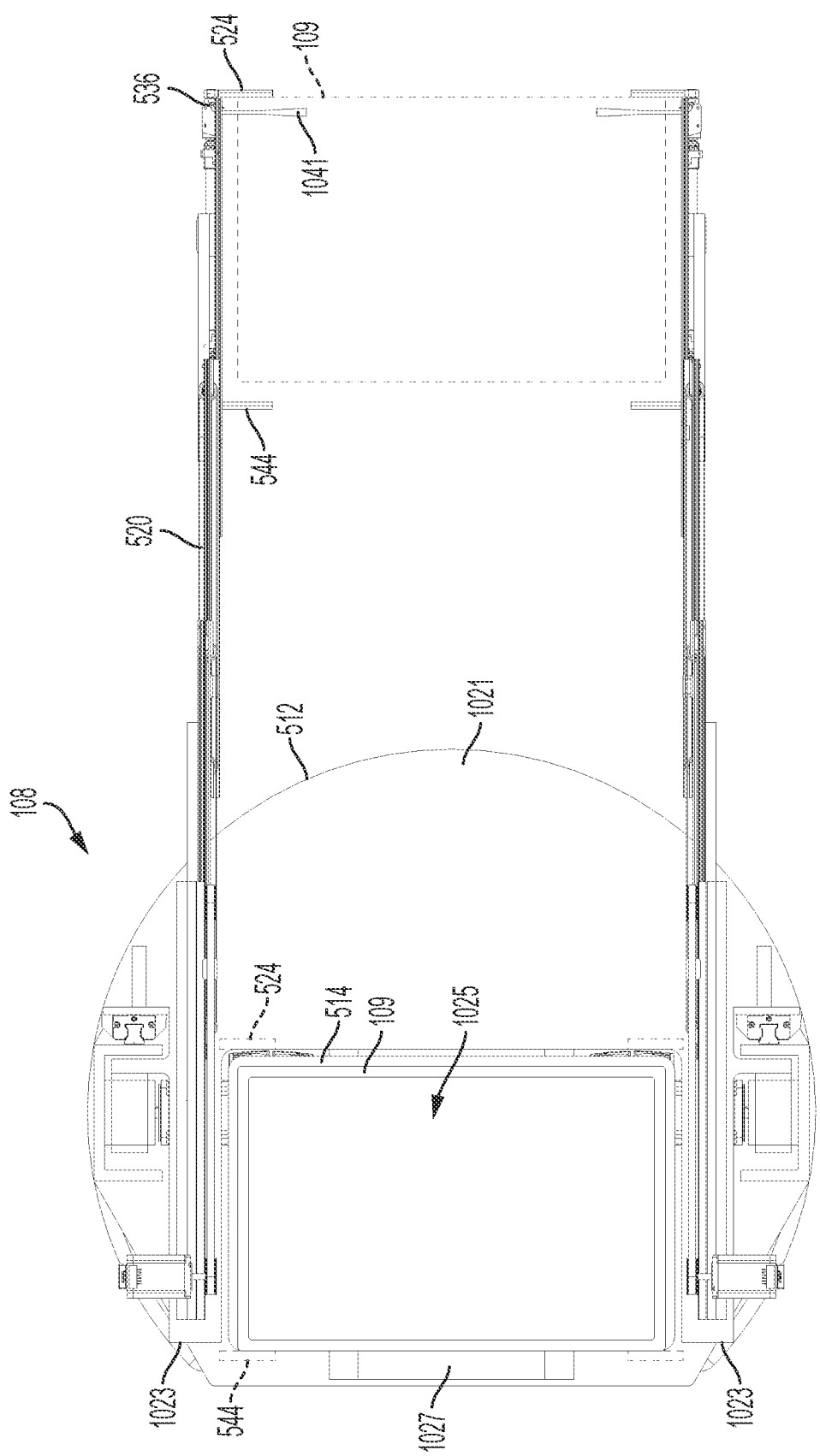

FIGS. 11 through 14 show another example of an inventory handler 108. The inventory handler 108 in FIGS. 11 through 14 can include features similar to those described with respect to FIGS. 5 through 6, 7 through 8, and/or 9 through 10. For conciseness, description of such features will not be repeated. FIGS. 11, 12, and 13 respectively show a front perspective, a rear perspective, and a top view of the inventory handler 108 in a state suitable for loading, while FIG. 13 shows a front perspective of the inventory handler 108 in a state suitable for transport.

Different from the inventory handler 108 in FIGS. 5 through 6, 7 through 8, and/or 9 through 10, the inventory holder in FIGS. 11 through 14 can include a telescoping arm 520 that can not only retract toward the platform 512 to pull a container 109 toward and/or onto the platform 512 but can also further retract to move the container 109 from the platform 512 onto one of the staging shelves 514.

Operability of the telescoping arm 520 may be facilitated by a shape and/or positioning of the platform 512. The platform 512 may be shaped to at least partially extend onto both the second lateral side 510 and the first lateral side 508. For example, the platform 512 may include a main part 1021 positioned for travel along the second lateral side 510. At least one extension 1023 can be coupled with the main part 1021 and be arranged for travel along the first lateral side 508. The telescoping arm 520 may be supported by or over the extension 1023, for example.

As may be best seen in FIG. 13, the platform 512 may include a substrate of one or more components that overall form a U-shape. For example, the U-shape may be formed at least in part by the main part 1021 and two opposite facing extensions 1023 coupled with the main part 1021. The extensions 1023 may be spaced apart to define an open center portion 1025 of the U-shape. The platform 512 may be sized to allow passage of the staging shelves 514 through the center portion 1025 of the U-shape during raising or lowering of the platform 512, for example.

The staging shelves 514 may be respectively supported by an aft member 1027. The aft member 1027 may be positioned on an opposite side away from the platform 512. Such placement may allow a close and/or dense fit between the staging shelves 514 and platform 512 and/or may avoid collision between support structure for the staging shelves 514 and the platform 512 during use.

In use, the handler 108 may align with a target container 109. For example, the handler 108 may raise or lower the platform 512 (e.g., by the hoist 518, such as illustrated by arrow 1031 in FIG. 11). The handler 108 may further utilize a turn-table 1033 for alignment. The turn-table 1033 may be incorporated into the base 504 of the frame 502 and/or otherwise suitable for imparting rotation to the upright 506 and/or the platform 512 (e.g., as illustrated by arrow 1035). The turn-table 1033 may be an example of, similar to, and/or used in place of the rotatable hub 528, for example. The rotation from the turn-table 1033 may enable fine angular orientation for alignment with the container 109 and/or may enable larger scale spinning to permit accessing from either side of an aisle 402.

The telescoping arm 520 may be extended away from the platform 512 and toward the target container 109, such as illustrated by arrow 1037 in FIG. 11. For example, the telescoping arm 520 may pass along a side of a container 109 supported by a storage shelf 244, such shown by way of example in FIG. 12. The storage shelf 244 may be part of a commodity shelving unit that is supported by pillars 246 that also support panels 124 along which the inventory handler 108 can travel, for example.

When the telescoping arm 520 is at a suitable position adjacent the container 109, the hook 524 on the telescoping arm 520 may be actuated (e.g., as illustrated by arrow 1039). For example, the hook 524 may be actuated in response to input from the sensor 536 (e.g., which may be positioned on the telescoping arm 520 or in some other suitable position for obtaining a field of view 1041 sufficient for detecting when the telescoping arm 520 is suitably positioned relative to the target container 109). The hook 524 may be actuated into a suitable position (e.g., depicted in solid lines in FIG. 13) so that retracting the telescoping arm 520 will pull the container 109 (e.g., from a position depicted in dashed lines in FIG. 13) toward the platform 512.

The telescoping arm 520 may be retractable toward and over the platform 512. For example, initial retraction of the telescoping arm 520 may pull the container 109 from the storage shelf 244 onto the platform 512. The platform 512 may be moved vertically (e.g., as illustrated by arrow 1031 in FIG. 11) to align with a target staging shelf 514. For example, the platform 512 may move so that at least one extension 1023 passes alongside one or more of the staging shelves 514 during vertical movement.

Figure 14:
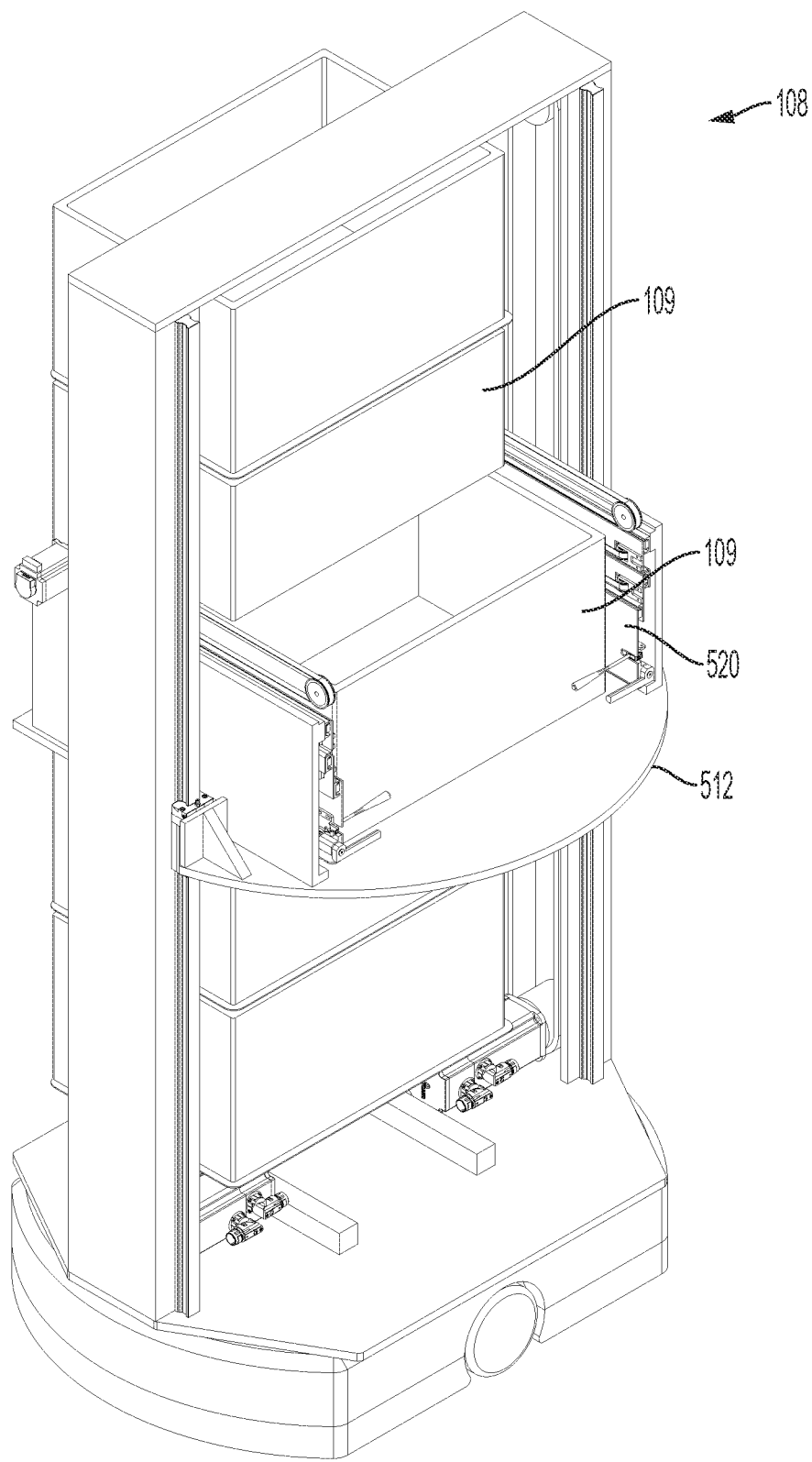

Once the platform 512 is aligned with a target staging shelf 514, the retractable arm may be further retracted. The further retraction may cause the telescoping arm 520 to retract to a position alongside a given staging shelf 514. The further retraction may move the container 109 from the platform 512 to the staging shelf 514. For example, the further retraction may cause the hook 524 to move to a position shown in dashed lines in FIG. 13 and pull the container 109 from the platform 512 to the position shown in solid lines in FIG. 13 (e.g., atop the staging shelf 514). For example, FIG. 14 shows an example of a container 109 partially transferred from the platform 512 to the staging shelf 514 and thus at least partially underneath another container 109.

To unload a container 109, the container 109 may be moved from the staging shelf 514 onto the platform 512. In some embodiments, an offloader 542 (e.g., not shown in FIGS. 11-14 but described above with respect to at least FIGS. 5 and 6) may be utilized to facilitate this transfer. Additionally or alternatively, the projection 544 may be actuated to a suitable position for pushing the container 109 from behind. For example, the projection 544 may be actuated as illustrated by the arrow 1043 in FIG. 11. The projection 544 may be actuated to the position shown in dashed lines in FIG. 13, e.g., which may correspond to a position over the extension 1023. Subsequent extension of the telescoping arm 520 may cause the projection 544 to push the container 109 onto the platform 512 (e.g., after which the platform 512 can reposition vertically to align with a storage shelf 244), and further extension of the telescoping arm 520 may cause the projection 544 to reach the position shown in solid lines in FIG. 13 or otherwise push the container 109 from the platform 512 onto the storage shelf 244. For example, in the unloading process, the container 109 may move from the position shown in solid lines in FIG. 13 to the position shown in dashed lines in FIG. 13.

The inventory handler 108 in FIGS. 11 through 14 is depicted with components arranged to load with a long edge of a container 109 facing toward the platform 512, in contrast to the depictions in FIGS. 5 through 6, 7 through 8, and/or 9 through 10 where components are arranged to load with the short edge of the container 109 facing toward the platform 512. In some embodiments, loading with the long edge of the container 109 facing toward the platform 512 may allow a larger number of containers to be stacked one after another in the depth direction along the storage shelf 244 (e.g., since the short edges are arranged in sequence instead of the long edges), although components may be reconfigured between loading with the long edge or the short edge facing the platform 512 without departing from the scope of the disclosure herein.

The telescoping arm 520 in FIGS. 11 through 14 is depicted with a series of three linear slides 1045, although any suitable number of slides 1045 may be utilized to achieve a desired level of compactness of form factor for the telescoping arm 520. The linear slides 1045 maybe coupled by belts 1047 so that extension of one slide 1045 cause a next slide 1045 in the series to extend by a same amount, although any suitable construction of telescoping components may be utilized.

Figure 15:
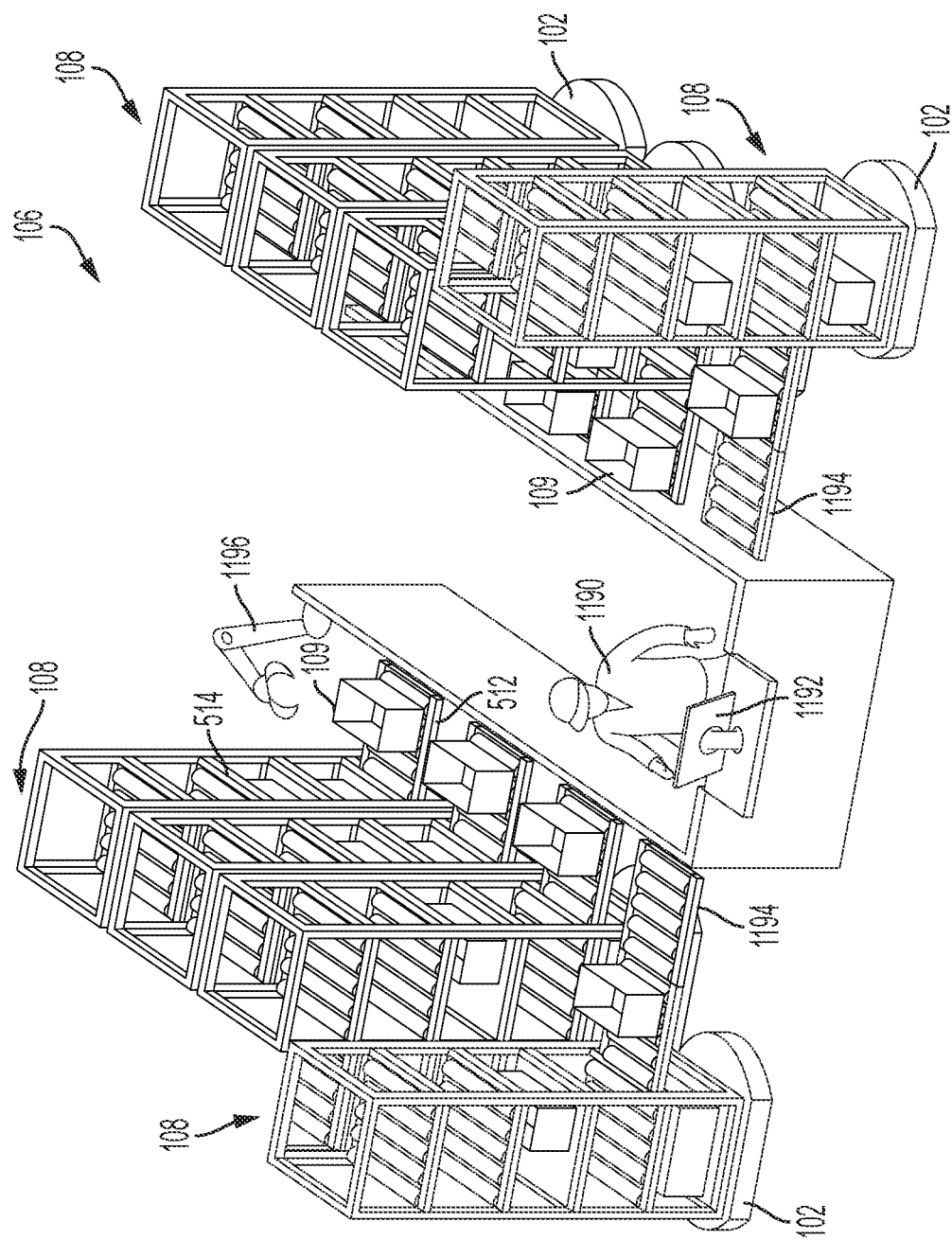
FIG. 15 is a perspective view showing an example of components that may be implemented in a station of the inventory system shown in FIG. 1 in accordance with various embodiments.

FIG. 15 is a perspective view showing an example of components that may be implemented in a station 106 of the inventory system 100 in accordance with various embodiments.

The inventory handlers 108 may be transported to suitable locations within the station 106 for processing of the containers 109. The inventory handlers 108 may be operated to access a container 109 from a staging shelf 514 and transfer to the platform 512. With a container 109 on the platform 512, the inventory handlers 108 may be operated to raise or lower the platform to position at an ergonomically suitable height for access by a standing operator 1190.

A user interface 1192 (e.g., a screen, speaker, set of indicator lights, or other structure capable of providing visual and/or auditory prompts), may provide instructions for an operator for processing the containers 109. For example, the operator 1190 may be tasked with removing items from containers 109 in inventory handlers 108 arranged in a retrieval queue (e.g., represented for example on the left of FIG. 15 and representing inventory handlers coming from the storage area 130) and moving into containers 109 in inventory handlers 108 arranged in an order queue (e.g., represented for example on the right of FIG. 15 and representing inventory handlers 108 slated for the order consolidation area 132).

Other features may be utilized to facilitate processing at the station 106. Although containers 109 may be accessed directly from inventory handlers 108, in some embodiments, the inventory handlers 108 may transfer containers 109 to roller tables, stands, or other intervening structures 1194 to facilitate processing. As another example, a robotic manipulator 1196 may be utilized, such as in response to remote control by a human operator 1190 or in response to automated control by management module 110.

Figure 16:
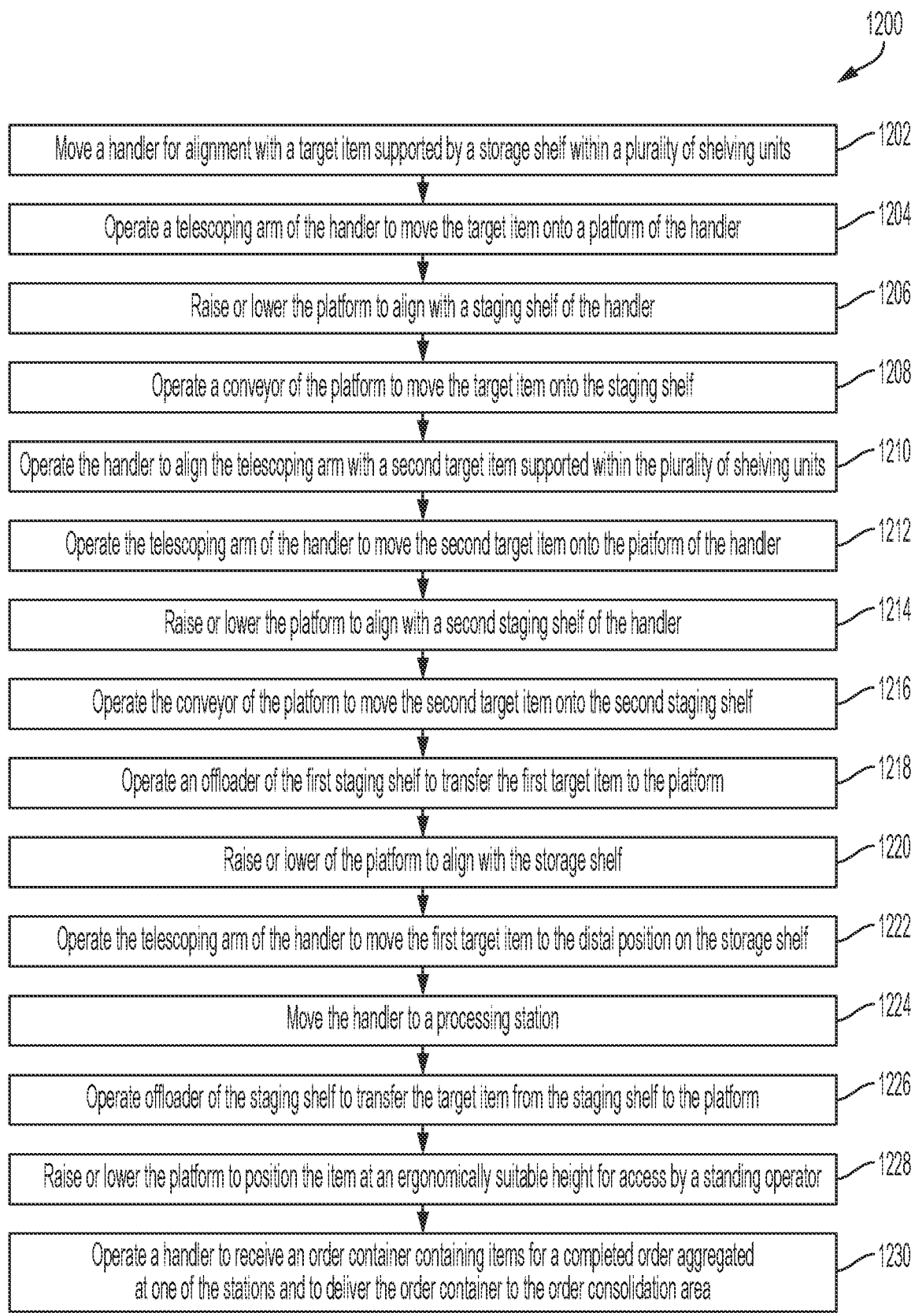
FIG. 16 is a flowchart illustrating a process of handling inventory with respect to components of the inventory system shown in FIG. 1, in accordance with various embodiments.

FIG. 16 is a flowchart illustrating a process 1200 of handling inventory, according to embodiments. Some or all of the process 1200 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The one or more computer systems may correspond to the management module 110, for example. Moreover, unless indicated otherwise, acts shown in the processes are not necessary performed in the order shown, and/or some acts can be omitted in embodiments.

The process 1200 at block 1202 can include moving a handler for alignment with a target item supported by a storage shelf within a plurality of shelving units. For example, this may include transporting an inventory handler 108 with a mobile drive unit 102 to an inventory holder 104 that contains a target or selected container 109. This task may be performed based on information from the management module 110 that the container 109 (or a container 109 buried one or other number deep behind an outer container 109) includes an item for a customer order. The movement at block 1202 additionally or alternatively may include raising or lowering the platform 512 with the hoist 518 to reach a vertical position aligned with the storage shelf 244 and/or container 109 to be initially accessed. The movement at block 1202 may additionally or alternatively include rotation of the rotatable hub 528 and/or the turn-table 1033, such as to provide fine angular alignment of the telescoping arm 520 with the depth of the container 109 or to spin the telescoping arm to be oriented toward a left or right side of the aisle 402 based on the location of the container as the inventory handler 108 travels along the aisle 402.

The process 1200 at block 1204 can include operating a telescoping arm of the handler to move the target item onto a platform of the handler. For example, this may include extension and retraction of the telescoping arm 520 to move a container 109 onto the platform 512 of the inventory handler 108. The operation at 1204 may include stowing and/or deploying the hook 524 of the telescoping arm 520 to facilitate movement of the container 109. For example, the hook 524 may be stowed prior to extension of the telescoping arm 520 (e.g., so the hook 524 can readily travel underneath, over, or alongside the container 109) and may be deployed prior to retraction of the telescoping arm 520 (e.g., so that the hook 524 can pull the container 109 toward the platform 512). The operation of the telescoping arm 520 at block 1204 may be from a position underneath the container 109 (e.g., as in FIG. 5), from along a lateral side of the container 109 (e.g., as in FIG. 7), or from a position above the container 109.

The process 1200 at block 1206 can include raising or lowering of the platform to align with a staging shelf of the handler. For example, this may include the hoist 518 operating to move the platform 512 to align at a suitable vertical location for transfer with the first staging shelf 514A or another staging shelf 514.

The process 1200 at block 1208 can include operating a conveyor of the platform to move the target item onto the staging shelf. For example, this may include the conveyor 540 moving the target container 109 to the first staging shelf 514A or another staging shelf. In some examples, the conveyor at block 1208 may include a structure used for another operation. For example, the conveyor utilized at block 1208 may correspond to use of the telescoping arm 520 to further retract to move the target item onto the staging shelf (e.g., as described with respect to FIG. 11). As another example, the conveyor utilized at block 1208 may correspond to use of the telescoping arm 520 to further extend to move the target item onto the staging shelf (e.g., as described with respect to FIG. 10).

The actions at block 1202 through 1208 may correspond to actions performed relative to a first target item and a first staging shelf Additional actions may correspond to second instances. For example, the actions at 1202 through 1208 may correspond to actions performed to move a first container 109 at a proximal or front position on the storage shelf 244 so as to clear the way or provide access to a second container 109 that may be positioned at a distal or rear position on the storage shelf 244, such as in situations where the second container 109 contains or corresponds to the item targeted or selected for a particular order or other task.

The process 1200 at block 1210 can include operating the handler to align the telescoping arm with a second target item supported within the plurality of shelving units. The action at block 1210 can include moving the inventory handler 108 with the mobile drive unit 102, such as in instances where the inventory handler 108 is tasked with retrieving a second container 109 at a second inventory holder 104 that differs from the location the first container 109 was accessed. However, the action at block 1210 may also include actions of the inventory handler 108 without movement by the mobile drive unit 102 (such as in instances where the second target item or container 109 is one that is buried two or more deep on the storage shelf 244). The movement at block 1210 may include raising or lowering the platform 512 with the hoist 518 to reach a vertical position aligned with the storage shelf 244 and/or second container 109 to be accessed. For example, this may correspond to vertically moving the platform 512 back to the same level at which the first container 109 was accessed. The movement at block 1202 may additionally or alternatively include rotation of the rotatable hub 528 and/or turn-table 1033, such as to provide fine angular alignment of the telescoping arm 520 with the depth of the second container 109.

The process 1200 at block 1212 can include operating the telescoping arm of the handler to move the second target item onto the platform of the handler. For example, this may include extension and retraction of the telescoping arm 520 to move the second target container 109 onto the platform 512. The operation at block 1212 can additionally or alternatively include other actions discussed at block 1204.

The process 1200 at block 1214 can include raising or lowering of the platform to align with a second staging shelf of the handler. For example, this may include the hoist 518 operating to move the platform 512 to align at a suitable vertical location for transfer with the second staging shelf 514B or another staging shelf 514.

The process 1200 at block 1216 can include operating the conveyor of the platform to move the second target item onto the second staging shelf. This may include utilizing the same conveyor as at block 1208. As illustrative examples, this may include the conveyor 540 moving the second target container 109 to the second staging shelf 514B or another staging shelf, and/or instead using the telescoping arm of FIG. 10 and/or of FIG. 11.

The process 1200 at block 1218 can include operation of an offloader of the first staging shelf to transfer the first target item to the platform; For example, this may include the offloader 542 moving the first target container 109 back onto the platform 512. This may occur after raising or lowering the platform 512 with the hoist 518 to reach a vertical position aligned with the first staging shelf 514A, for example. In some examples, the offloader at block 1218 may include a structure used for another operation. For example, the offloader utilized at block 1218 may correspond to use of the telescoping arm 520 to extend to move the target item off of the staging shelf and onto the platform (e.g., as described with respect to FIG. 11). As another example, the offloader utilized at block 1208 may correspond to use of the telescoping arm 520 to retract to move the target item off of the staging shelf and onto the platform 512 (e.g., as described with respect to FIG. 10).

The process 1200 at block 1220 can include raising or lowering of the platform to align with the storage shelf. For example, this may include the hoist 518 raising the platform 512 with the first container 109 thereon to the level of the originally accessed storage shelf 244 (or another storage shelf 244).

The process 1200 at block 1222 can include operating of the telescoping arm of the handler to move the first target item to the storage shelf. For example, the telescoping arm 520 may move the first target container 109 back onto the storage shelf 244. The first target container 109 may be put back based on having been blocking access to the second target container 109 and/or for not containing items designated in the task assigned to the inventory handler 108. The telescoping arm 520 may move the first target container 109 to the proximal position (e.g., the position at which the first target container started), or to the distal position (e.g., effectively swapping the first container 109 into the position originally occupied by the second target container 109).

The process 1200 at block 1224 can include moving the handler to a processing station. For example, this may include moving the inventory handler 108 to a processing station 106. The movement may include traveling from the upper floors 120 to a ground floor 120 via a lift 122 and/or otherwise moving from a storage area 130 to the station 106.

The process 1200 at block 1226 can include operation of an offloader of the staging shelf to transfer the target item from the staging shelf to the platform. This may include utilizing the same offloader as at block 1218. As an illustrative example, this may include operating the offloader 542 to move the target or selected container 109 to the platform 512, e.g., based on an indication from the management module 110 that the container 109 includes an item for an order. As other examples, this could include instead using the telescoping arm of FIG. 10 and/or of FIG. 11 The target or selected container 109 may correspond to the second container 109 that was accessed from being buried two, three, or another number deep, for example.

The process 1200 at block 1228 can include raising or lowering of the platform to position the item at an ergonomically suitable height for access by a standing operator. For example, this may correspond to the hoist 518 vertically positioning the platform 512 at a suitable height for a standing operator 1190 to readily access the container 109 at the station 106. For example, the operator 1190 may reach into the container 109 and move the item to another container 109 on an inventory handler 108 arranged to receive and/or aggregate items for orders.

The process 1200 at block 1230 can include operation of one of the handlers to receive an order container containing items for a completed order aggregated at one of the stations and to deliver the order container to the order consolidation area. For example, this may include an inventory handler 108 taking the container 109 with the aggregated items from block 1228 and delivering to the order consolidation area 132. In the order consolidation area 132, the inventory handler 108 may transfer the container 109 with the aggregated items to another structure, or may await further instructions to deliver to a delivery truck or other location, for example.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory handling system, comprising:
 a plurality of shelving units each having a plurality of vertically-distributed storage shelves, each storage shelf configured to receive and support a plurality of totes;
 a plurality of stations configured for processing of totes from the plurality of totes;
 a plurality of tote handlers moveable among the plurality of shelving units and the plurality of stations, each of the tote handlers comprising:
  a vertical frame defining a first lateral side opposite a second lateral side;
  a plurality of staging shelves supported along the first lateral side of the vertical frame and comprising at least a first staging shelf arranged above a second staging shelf;
  a platform raisable and lowerable along the second lateral side of the vertical frame; and a telescoping arm extendable from the platform and retractable toward and over the platform;

a plurality of floors that includes a ground floor and at least one upper floor, wherein the plurality of shelving units are located along the at least one upper floor and are formed from commodity shelving having pillars, the pillars supporting the storage shelves and supported by the ground floor, wherein the plurality of stations are located along the ground floor, wherein the tote handlers are movable among the ground floor and the at least one upper floor, and wherein the at least one upper floor is formed from panels connected with and supported by the pillars; and a management module operable to:
instruct operation of a selected tote handler to align with a first selected tote supported by the plurality of shelving units, to extend and retract the telescoping arm to move the first selected tote onto the platform, to raise or lower the platform to align with the first staging shelf, and to further retract the telescoping arm to move the first selected tote from the platform onto the first staging shelf;
instruct operation of the selected tote handler to align with a second selected tote supported by the plurality of shelving units, to extend and retract the telescoping arm to move the second selected tote onto the platform, to raise or lower the platform to align with the second staging shelf, and to further retract the telescoping arm to move the second selected tote from the platform onto the second staging shelf; and
instruct movement of the selected tote handler carrying the first selected tote and the second selected tote to a selected station for processing.

2. The inventory handling system of claim 1, wherein each storage shelf is sized for containing at least three totes end to end along a depth of the storage shelf;
wherein the telescoping arm is sized to extend sufficiently to at least three tote lengths; and
wherein the management module is operable to instruct operation of the telescoping arm to retrieve the first selected tote from a front location on a selected storage shelf, to retrieve the second selected tote from a middle location on the selected storage shelf, and to retrieve a third selected tote from a rear location on the selected storage shelf.

3. The inventory handling system of claim 1, wherein the pillars of the commodity shelving extend above and below the panels forming the at least one upper floor.

4. The inventory handling system of claim 1, further comprising an order consolidation area located on the ground floor, wherein the management module is further operable to:
instruct operation of one of the tote handlers to receive an order tote containing items for a completed order aggregated at one of the stations and to deliver the order tote to the order consolidation area.

5. A handler for use in an inventory handling system, the handler comprising:
a frame defining a first lateral side opposite a second lateral side;
a plurality of staging shelves arranged above one another and supported along the first lateral side;
a platform raisable and lowerable along the second lateral side of the frame; and
a telescoping arm extendable away from the platform for engaging a container and retractable toward the platform for moving the container onto the platform, the telescoping arm further retractable for movement of the container from the platform to one of the plurality of staging shelves, wherein the platform comprises at least one of:
(i) a main part positioned for travel along the second lateral side, and an extension coupled with the main part and positioned for travel along the first lateral side, wherein the telescoping arm is supported by or over the extension; or
(ii) a substrate having a U-shape sized to allow passage of the staging shelves through a center portion of the U-shape during raising or lowering of the platform.

6. The handler of claim 5, wherein the telescoping arm is retractable to a position alongside said staging shelf for transfer of the container from the platform to said staging shelf.

7. The handler of claim 5, wherein each of staging shelf comprises an offloader configured for imparting container movement from the staging shelf to the platform.

8. The handler of claim 5, wherein the arm is coupled with a projection arranged to push the container off the platform from behind during extension of the telescoping arm.

9. The handler of claim 5, wherein the arm is coupled with a hook arranged to pull the container onto the platform during retraction of the telescoping arm.

10. The handler of claim 9, wherein the hook is collapsible to a stowed position to facilitate passage past a side of the container during extension of the arm.

11. The handler of claim 5, wherein the frame is coupled with a rotatable hub to facilitate rotation of approximately 180 degrees between orientations for accessing a container on either a right side or a left side of the handler.

12. A method comprising:
instruct movement of a handler for alignment with a target item supported by a storage shelf within a plurality of shelving units;
instruct extension and retraction of a telescoping arm of the handler to move the target item onto a platform of the handler;
instruct raising or lowering of the platform to align with a staging shelf of the handler, wherein each of staging shelf comprises an offloader configured for imparting container movement from the staging shelf to the platform; and
instruct further retraction of the telescoping arm to move the target item onto the staging shelf.

13. The method of claim 12, wherein the target item is a first target item and the staging shelf is a first staging shelf, wherein the method further comprises:
instruct operation of the handler to align the telescoping arm with a second target item supported within the plurality of shelving units;
instruct extension and retraction of the telescoping arm of the handler to move the second target item onto the platform of the handler;
instruct raising or lowering of the platform to align with a second staging shelf of the handler; and
instruct further retraction of the telescoping arm to move the second target item onto the second staging shelf.

14. The method of claim 13, wherein prior to operation of the handler, the first target item is located at a proximal position on the storage shelf and the second target item is located at a distal position on the storage shelf.

15. The method of claim 14, further comprising:
instruct operation of the offloader of the first staging shelf to transfer the first target item to the platform;

instruct raising or lowering of the platform to align with the storage shelf; and instruct extension of the telescoping arm of the handler to move the first target item to the proximal position on the storage shelf.

16. The method of claim 12, wherein the instructing movement of the handler for alignment with the target item comprises instructing rotation of a hub to adjust an angular orientation of the telescoping arm relative to the target item.

* * * * *